United States Patent
Tyulyaev et al.

(10) Patent No.: US 11,461,409 B2
(45) Date of Patent: Oct. 4, 2022

(54) DIGITIZATION OF TECHNICAL DOCUMENTATION DRIVEN BY MACHINE LEARNING

(71) Applicant: Accenture Global Solutions Limited, Dublin (IE)

(72) Inventors: Alexey Valeryevich Tyulyaev, Houston, TX (US); Ekaterina Yuryevna Tyulyaeva, Houston, TX (US); Neil Perry Christianson, Houston, TX (US)

(73) Assignee: Accenture Global Solutions Limited, Dublin (IE)

( * ) Notice: Subject to any disclaimer, the term of this patent is extended or adjusted under 35 U.S.C. 154(b) by 734 days.

(21) Appl. No.: 16/435,009

(22) Filed: Jun. 7, 2019

(65) Prior Publication Data
US 2020/0387553 A1 Dec. 10, 2020

(51) Int. Cl.
| | |
|---|---|
| *G06N 3/08* | (2006.01) |
| *G06F 16/93* | (2019.01) |
| *G06V 30/422* | (2022.01) |
| *G06V 30/10* | (2022.01) |
| *G06F 40/279* | (2020.01) |
| *G06V 10/44* | (2022.01) |
| *G06V 10/82* | (2022.01) |
| *G06T 7/00* | (2017.01) |
| *G06T 7/11* | (2017.01) |
| *G06T 7/60* | (2017.01) |

(52) U.S. Cl.
CPC ............ *G06F 16/93* (2019.01); *G06N 3/08* (2013.01); *G06V 30/10* (2022.01); *G06V 30/422* (2022.01); *G06F 40/279* (2020.01); *G06T 7/0004* (2013.01); *G06T 7/11* (2017.01); *G06T 7/60* (2013.01); *G06T 2207/20081* (2013.01); *G06V 10/44* (2022.01); *G06V 10/82* (2022.01)

(58) Field of Classification Search
CPC ....... G06F 16/93; G06F 40/279; G06V 30/10; G06V 30/422; G06V 10/82; G06N 3/08; G06T 7/11; G06T 7/0004; G06T 7/60; G06T 2207/20081
See application file for complete search history.

(56) References Cited

U.S. PATENT DOCUMENTS

| | | | |
|---|---|---|---|
| 2018/0268506 A1* | 9/2018 | Wodetzki | G06V 30/413 |
| 2019/0019022 A1* | 1/2019 | Marda | G06V 30/418 |
| 2019/0251150 A1* | 8/2019 | Vinay | G06N 3/0454 |
| 2019/0251193 A1* | 8/2019 | Singuru | G06F 16/93 |
| 2019/0266573 A1* | 8/2019 | Radhakrishnan | G06F 16/383 |
| 2019/0384807 A1* | 12/2019 | Dernoncourt | G06N 3/08 |
| 2020/0364451 A1* | 11/2020 | Ammar | G06K 9/6256 |

* cited by examiner

*Primary Examiner* — Syed Haider
(74) *Attorney, Agent, or Firm* — Harrity & Harrity, LLP

(57) ABSTRACT

A device receives a technical document that includes content comprising: shapes that depict assets, lines that connect to the shapes and that depict connections to the assets, and text describing one or more of the assets and/or connections. The device converts data that describes the content, identifies a first group of spatial coordinates for the shapes, identifies a second group of spatial coordinates for the lines, and identifies a third group of spatial coordinates for the text. The device generates a data structure that associates shapes data for the shapes, lines data for the lines, and text data for the text, to permit another device to use the shapes data, the lines data, and the text data, to perform actions.

20 Claims, 20 Drawing Sheets

| Third Set of Pre-Processing Operations |
|---|
| • Convert to grayscale if step not yet performed |
| • Binarize blueprint documents if step not yet performed |
| • Remove lines from blueprint documents |

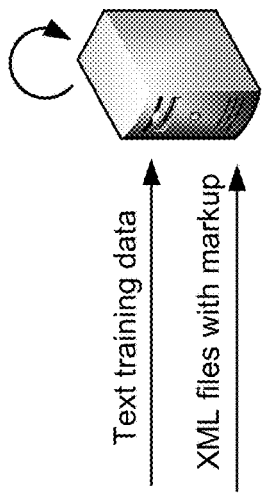

112
Perform third set of pre-processing operations

Document Management Platform

| Third Data Model |
|---|
| • Train to identify text within shapes |
| • Train to identify text near shapes |
| • Train to identify text near lines |

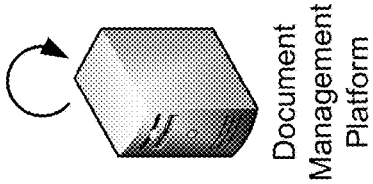

114
Train third data model to identify text within blueprint documents

Text training data

XML files with markup

Document Management Platform

FIG. 1C

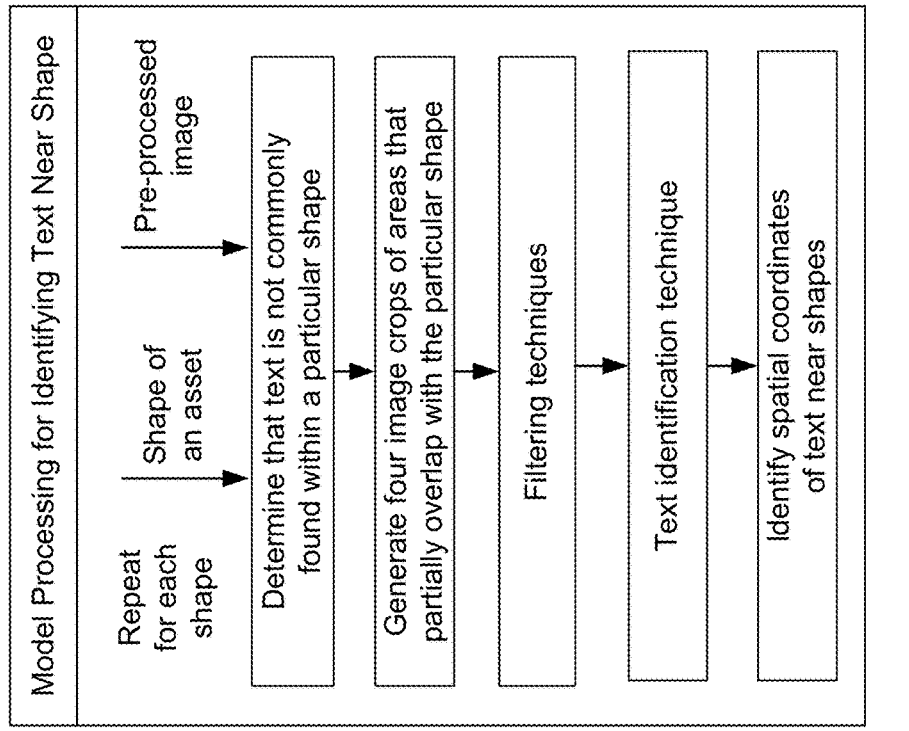
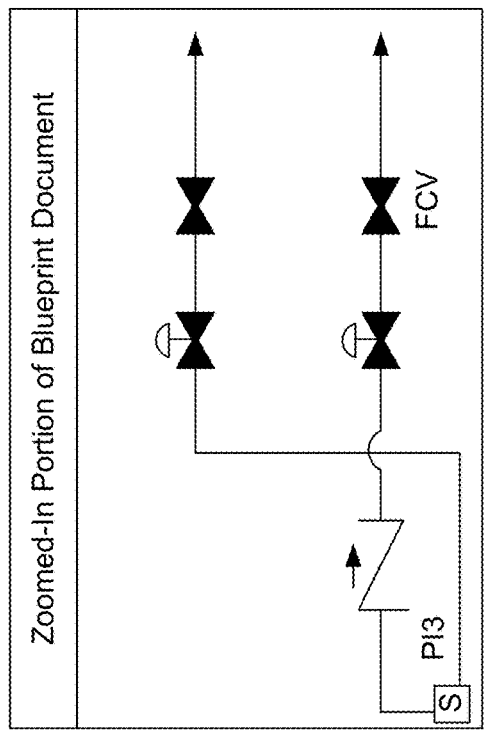
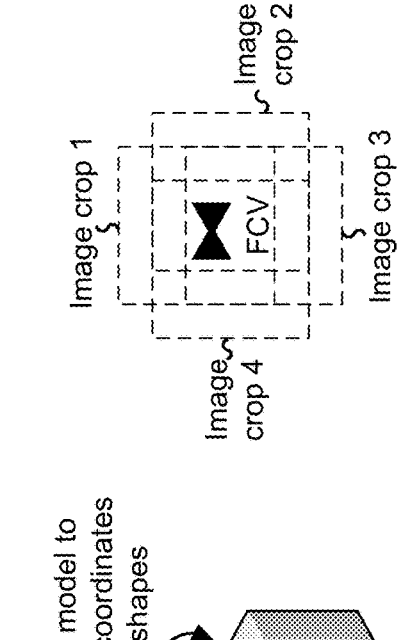
FIG. 1K

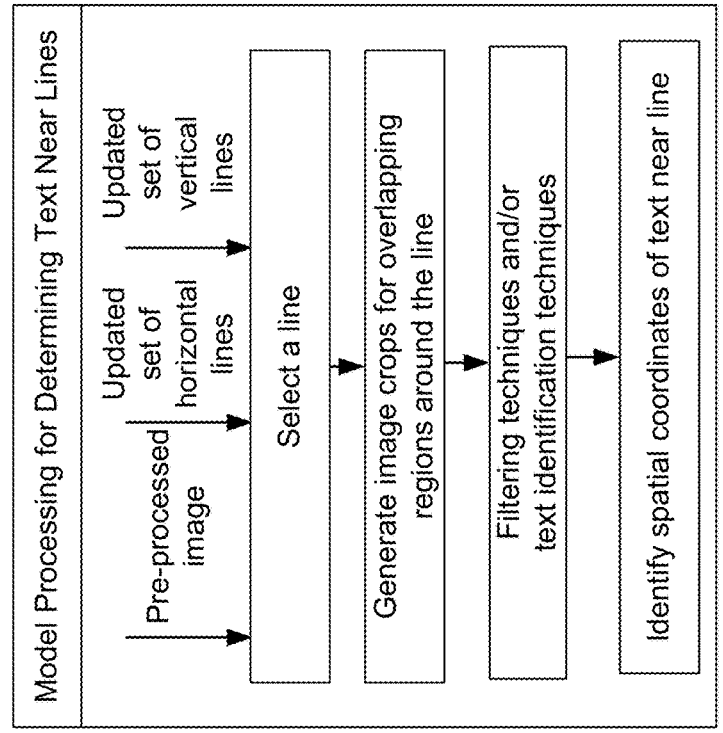
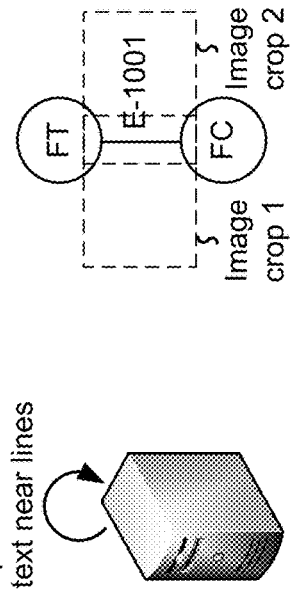
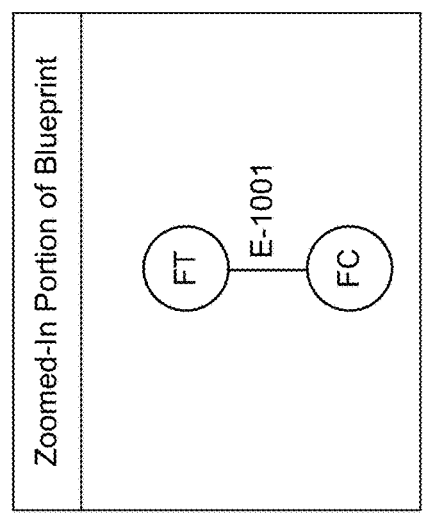
FIG. 1L

DIGITIZATION OF TECHNICAL DOCUMENTATION DRIVEN BY MACHINE LEARNING

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some implementations, a method may include receiving, by a device, a technical document, wherein the technical document includes content comprising: a set of shapes that depict assets, a set of lines that connect to the set of shapes and that depict connections to the assets, and text describing at least one of: one or more of the assets, or one or more of the connections. The method may include performing, by the device, a set of pre-processing operations to convert the data to a format capable of being processed by a set of data models, and identifying, by the device, a first group of spatial coordinates for the set of shapes within the technical document by processing the data that has been converted using a first data model of the set of data models, wherein the first data model has been trained using one or more shape detection techniques that are driven by machine learning. The method may include identifying, by the device, a second group of spatial coordinates for the set of lines within the technical document by processing the data that has been converted using a second data model of the set of data models, wherein the second data model has been trained using a set of line detection techniques. The method may include identifying, by the device, a third group of spatial coordinates for the text within the technical document by processing the data that has been converted using a third data model of the set of data models, wherein the third data model has been trained using one or more text detection techniques. The method may include generating, by the device, a data structure that associates shape data that identifies the set of shapes, line data that identifies the set of lines, and text data that identifies the text, based on the first group of spatial coordinates, the second group of spatial coordinates, and the third group of spatial coordinates. The method may include performing, by the device, a first set of one or more actions that cause the shape data, the line data, and the text data, to be used by one or more other devices when performing a second set of actions.

According to some implementations, a device may include one or more memories, and one or more processors, communicatively coupled to the one or more memories, to receive data that describes content of a technical document, wherein the content includes: a set of shapes that depict assets, a set of lines that connect to the set of shapes and that depict the assets, and text describing at least one of: one or more of the assets, or one or more of the connections. The one or more processors may perform a set of pre-processing operations to convert the data to a format capable of being processed by techniques that detect shapes, lines, and text, and generate a first array of values that represent a first group of spatial coordinates for the set of shapes within the technical document, wherein the first array of values is generated by processing the data that has been converted using one or more shape detection techniques that are driven by machine learning. The one or more processors may generate a second array of values that represent a second group of spatial coordinates for the set of lines within the technical document, wherein the second array of values is generated by processing the data that has been converted using a set of line detection techniques. The one or more processors may generate a third array of values that represent a third group of spatial coordinates for the text within the technical document, wherein the third array of values is generated by processing the data that has been converted using one or more text detection techniques that are driven by machine learning. The one or more processors may generate a data structure that associates shape data that identifies the set of shapes, line data that identifies the set of lines, and text data that identifies the text, based on the first array of values, the second array of values, and the third array of values, and provide the shape data, the line data, and the text data, for display via an interface that is accessible to one or more other devices to permit the one or more other devices to validate the contents of the data structure.

According to some implementations, a non-transitory computer-readable medium may store instructions that include one or more instructions that, when executed by one or more processors of a device, cause the one or more processors to receive a data model that has been trained to identify shapes, lines, and text, within technical documents. The one or more instructions may cause the one or more processors to receive data that describes content of a technical document, wherein the content includes: a set of shapes that depict assets, a set of lines that connect to the set of shapes and that depict the assets, and text describing at least one of: one or more of the assets, or one or more of the connections. The one or more instructions may cause the one or more processors to perform a set of pre-processing operations to convert the data to a format capable of being processed by the data model, and identify a first group of spatial coordinates for the set of shapes within the technical document by processing the data that has been converted using a first module of the data model, wherein the first module of the data model has been trained using one or more shape detection techniques that are driven by machine learning. The one or more instructions may cause the one or more processors to identify a second group of spatial coordinates for the set of lines within the technical document by processing the data that has been converted using a second module of the data model, wherein the second module of the data model has been trained using a set of line detection techniques. The one or more instructions may cause the one or more processors to identify a third group of spatial coordinates for the text within the technical document by processing the data that has been converted using a third module of the data model, wherein the third module of the data model has been trained using one or more text detection techniques. The one or more instructions may cause the one or more processors to generate one or more data structures that associate shape data that identifies the set of shapes, line data that identifies the set of lines, and text data that identifies the text, based on the first group of spatial coordinates, the second group of spatial coordinates, and the third group of spatial coordinates. The one or more instructions may cause the one or more processors to perform a first set of one or more actions that cause the shape data, the line data, and the text data, to be used by one or more other devices when performing a second set of actions.

DETAILED DESCRIPTION

Figure 1A:
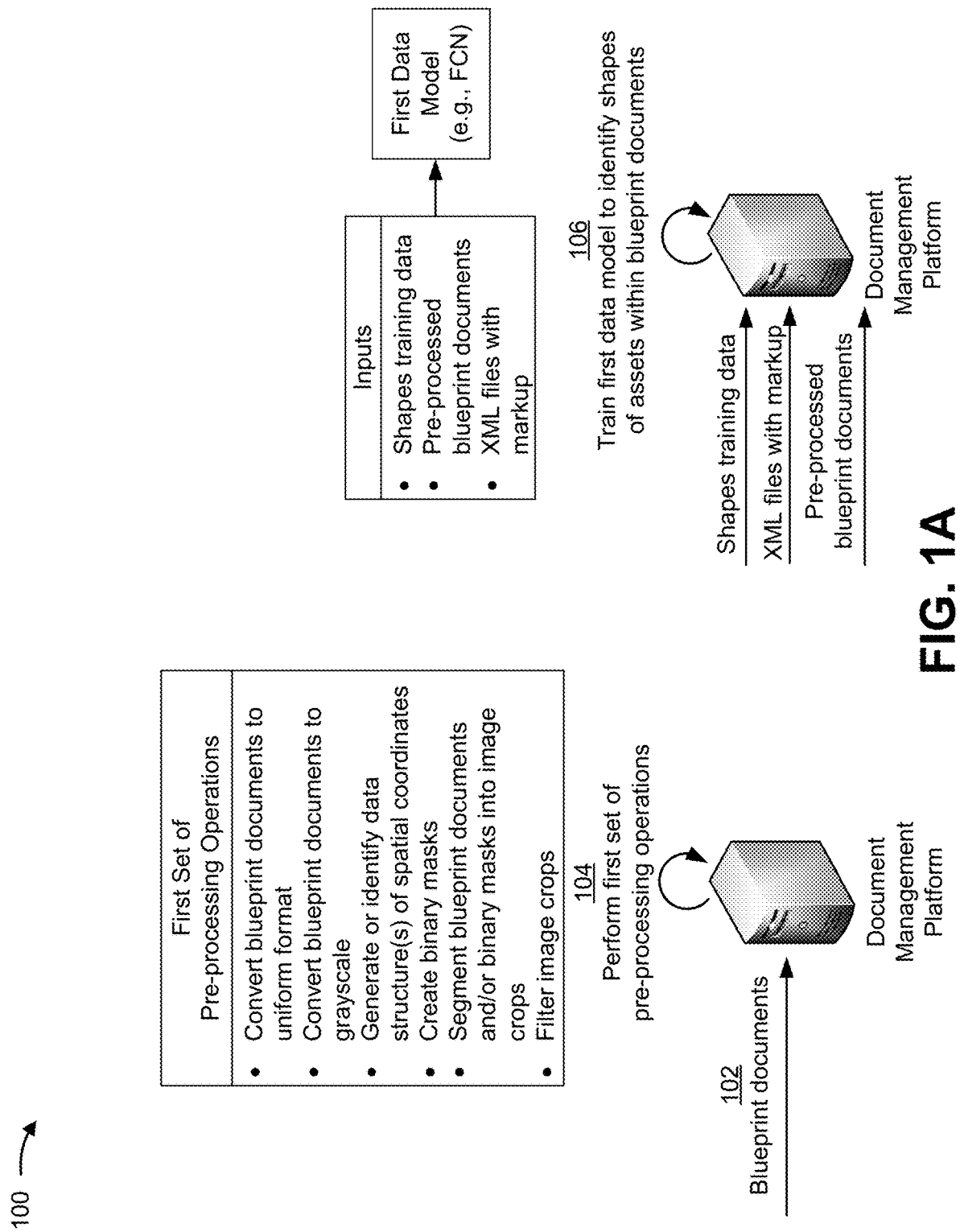
FIGS. 1A-1O are diagrams of one or more example implementations described herein.

The following detailed description of example implementations refers to the accompanying drawings. The same reference numbers in different drawings may identify the same or similar elements.

An organization may create technical documentation to describe assets, properties, and/or the like. For example, the organization may create a technical document for a building that the organization is tasked with constructing, may create a technical document for an asset that the organization is tasked with creating, and/or the like.

However, one or more devices of the organization may struggle to efficiently and effectively manage a corpus of technical documents. For example, the one or more devices may struggle to efficiently and effectively manage the corpus because of the quantity of documents in the corpus (e.g., a corpus of technical documents may have thousands, tens of thousands, hundreds of thousands, or more, drafts of various technical documents), because of technical documents having different file types and/or file formats, because of large file sizes that may make technical documents unable to be effectively processed using conventional natural language processing techniques, and/or the like.

Adding further complication, the technical documents may be riddled with inconsistencies, may use different approaches or terminology hierarchies, may have inconsistencies between drafts of particular technical documents, and/or the like. This makes it difficult for the one or more devices of the organization to effectively identify content within the technical documents.

Furthermore, even if the one or more devices of the organization were able to identify the content within the technical documents, the one or more devices may not have a way to establish relationships between content within a technical document, may not have a way to establish relationships between content across multiple technical documents, and/or the like. As an example, if technical documents are created at different time periods, and a symbol used to represent an asset changes over time (and/or a meaning of the symbol changes over time), there may be discrepancies between the technical documents that inhibit the one or more devices from effectively establishing associations between the content in iterations of technical documents that were created before the change and iterations of technical documents that are created after the change. Additionally, the organization may create technical documents for a group of client organizations that adhere to client-specific standards, thereby further preventing the one or more devices from efficiently and effectively managing content across technical documents.

Some implementations described herein provide a document management platform to use machine learning to identify content within a technical document. For example, the document management platform may use machine learning to identify a set of shapes, a set of lines, and a set of text, within the technical document. In this case, the document management platform may receive a technical document (e.g., as part of a request, identified based on information in a request, and/or the like) and may perform a set of pre-processing operations to convert the technical document to a format capable of being processed by a set of data models. Additionally, the document management platform may identify a first group of spatial coordinates for the set of shapes within the technical document by analyzing the technical document using a first data model that has been trained to perform shape detection. The document management platform may then identify a second group of spatial coordinates for the set of lines within the technical document by analyzing the technical document using a second data model that has been trained to perform line detection. Next, the document management platform may identify a third group of spatial coordinates for the text within the technical document by analyzing the technical document using a third data model that has been trained to detect and recognize text.

This may allow the document management platform to use the first, second, and third group of spatial coordinates to generate (or update) one or more data structures that associate shape data that identifies the set of shapes, line data that identifies the set of lines, and text data that identifies the text. Furthermore, the document management platform may perform a first set of actions that cause or permit one or more other devices to perform a second set of actions. For example, the document management platform may generate and provide a client device with a report that summarizes associations made by the one or more data structures, that includes summary statistics relating to the technical document (e.g., general statistics, statistics relating to similar types of technical documents, and/or the like), summary statistics that indicate whether particular errors were identified and/or automatically updated, and/or the like. This may cause the client device to provide feedback information back to the document management platform, which the document management platform may use to update associations made by the one or more data structures, update content included within the technical document, update machine learning procedures used to identify content within the technical document (e.g., to improve accuracy of subsequent tasks performed by the set of data models), and/or the like. This process may, in some cases, be performed for a corpus of technical documents for an organization. Additionally, one or more other actions may be performed and are described further herein.

In this way, the document management platform efficiently and effectively identifies and establishes associations between different content within the technical document, between content across multiple technical documents, and/or the like. For example, by performing one or more pre-processing operations on the technical document, the document management platform conserves resources (e.g., processing resources, network resources, memory resources, and/or the like) that would otherwise be wasted processing unnecessary aspects of the technical document (and/or unnecessary data related to the technical document).

Additionally, by using the set of data models to identify the set of shapes, the set of lines, and the text within the technical document, the document management platform improves accuracy of content identification and conserves resources that an inferior platform would waste by performing conventional natural language processing techniques and/or optical character recognition (OCR), conserves resources that the inferior platform or other devices would waste performing error correction techniques after the conventional natural language processing and/or OCR produced sub-optimal results, and/or the like. Moreover, by performing three separate analyses to identify the set of shapes, the set of lines, and the set of text, the document management platform improves accuracy of content identification and conserves resources relative to an inferior solution that attempts to inefficiently and/or ineffectively identify the set of shapes, the set of lines, and the set of text concurrently (e.g., using one analysis).

Furthermore, the document management platform may identify errors included within the technical document and may, in some cases, automatically correct the errors. This conserves resources that would otherwise be wasted attempting to create associations to inaccurate data, resources that would be needed to manually search for and correct errors, and/or the like. Moreover, by associating different content within the technical document and/or by associating similar content across multiple technical documents, the document management platform conserves resources that would be wasted creating duplicative content, resources that would be wasted creating inconsistent content, resources that would be wasted by devices that would be used to manually access re-useable content in other technical documents, resources that would be wasted to implement a change across multiple technical documents (e.g., by manually making the change in each document), and/or the like.

FIGS. 1A-1O are diagrams of one or more example implementations 100 described herein. Example implementation(s) 100 may include a document management platform and a client device. As shown in FIGS. 1A-1O, the document management platform may use machine learning to identify content (e.g., shapes, lines, text, etc.) within a blueprint document, establish associations between different types of content, and may, based on the content and/or the associations, identify and/or correct errors included within the blueprint document, may generate a report that summarized the identified content and/or associations and/or that recommends modifying one or more aspects of the blueprint document, and/or the like.

While some implementations described herein describe operations used in connection with a single blueprint document, it is to be understood that this is provided by way of example. In practice, the document management platform may perform operations described herein on a corpus of blueprint documents, such that an organization is able to efficiently and effectively manage large quantities of blueprint documents. Additionally, while one or more implementations described herein refer to blueprint documents, it is to be understood that these implementations may be applied to any type of technical document. Furthermore, while one or more implementations described herein refer to a set of data models that are used to identify content within the blueprint document, it is to be understood that this is provided by way of example. In practice, a single data model may perform functionality described as being performed by the set of data models, a function described as being part of a data model may be performed without the use of the data model (e.g., without the use of machine learning, such as by using configurable rules), and/or the like. Moreover, one or more data models described herein include one or more modules for performing various functions. In practice, functions described by two or more modules may be performed by a single module. Additionally, a data model described as having multiple modules may, in some cases, be implemented using a separate data model to carry out functionality of each respective module.

As shown in FIG. 1A, and by reference number 102, the document management platform may receive a set of blueprint documents. For example, the document management platform may receive a set of blueprint documents that may be used to train a set of data models to identify different types of content within blueprint documents.

The set of blueprint documents may include a set of design documents, a set of architectural drawings, a set of floor plans, a set of construction drawings, a set of whiteprint plan documents, and/or the like. A blueprint document may be an electrical, instrumentation, and control engineering (E&IC) document, an information systems and operations management (ISOM) document, a document that includes a piping and instrumentation (P&ID) diagram, a document that includes a process flow diagram (PFD), a document that includes a utility flow diagram, and/or the like. The set of blueprint documents may include content, such as shapes that represent one or more assets depicted within particular blueprint documents, lines that connect to the shapes and that depict connections to particular assets (e.g., physical connections, electrical connections, virtual connections, and/or the like), text describing particular assets and/or connections, and/or the like. The set of blueprint documents may include physical documents and/or electronic documents, such as an electronic document that is in a joint photographic group (JPG) format, a portable network graphics (PNG) format, a portable document format (PDF), a format associated with a computer aided design (CAD) tool, and/or a similar type of format.

As shown by reference number 104, the document management platform may perform a first set of pre-processing operations. For example, the document management platform may perform a first set of pre-processing operations to convert the set of blueprint documents to a format that may be used to train a first data model.

In some implementations, the document management platform may convert the set of blueprint documents to a uniform format. For example, if the document management platform receives a first group of blueprint documents in an image format, a second group of blueprint documents in a PDF format, and third group of blueprint documents in a format associated with a CAD tool, the document management platform may convert the second and third groups of blueprint documents to the image format, such that all (or some) blueprint documents are in a uniform format. In this way, the document management platform is able to convert all (or some) blueprint documents to a uniform format that may be used for training the first data model.

To reduce a processing load that will be required by the first data model, the document management platform may convert the set of blueprint documents to grayscale (or to black and white). For example, the document management platform may convert a blueprint document to grayscale or black and white by performing a color conversion technique. In this case, the document management platform may convert the blueprint document, which may be an image that includes pixels representing colors of a Red-Green-Blue (RGB) color scheme, such that the image includes pixels that represent grayscale (or black and white) colors.

In some implementations, the document management platform may generate (or identify) a data structure of spatial coordinates for a blueprint document. For example, if a blueprint document is 800×800 pixels, the document management platform may generate a data structure that maps spatial coordinates to pixels within the blueprint document. In this case, a pixel may correspond to an X-coordinate and to a Y-coordinate. Additionally, spatial coordinates that share an X-coordinate or that share a Y-coordinate may be said to be part of the same row or column within the data structure. Additionally, or alternatively, the document management platform may receive a set of extensible markup language (XML) files, a set of JavaScript Object Notation (JSON) files, and/or similar types of files, that include spatial coordinates for one or more templated image sizes (e.g., which may correspond to particular types of blueprint documents).

In some implementations, the document management platform may perform one or more additional pre-processing operations before training the first data model. For example, the document management platform may generate a set of binary masks for shapes within the set of technical documents. A binary mask may define a region of interest (ROI), that may be applied within a technical document, that represents a particular shape. The binary mask may be an array of values that are mapped to particular spatial coordinates. In some cases, a number of binary masks generated for a blueprint document may be equal to a number of shapes that the document management platform has been configured to identify. As an example, if a blueprint document has ten different types of shapes, and the document management platform has been configured to identify twenty different types of shapes, then the document management platform will generate twenty binary masks for the blueprint document. In this example, a binary mask may include values of zero at spatial coordinates of pixels that are part of a shape and may include values of one at spatial coordinates of pixels that are not part of the shape.

Many of the blueprint documents may have a file size that is too large for the first data model to effectively process. As such, some existing techniques reduce image quality to lighten a processing load that may be needed to by a model. However, too much reduction of image quality may hinder accurate identification of content.

In some implementations, rather than reduce image quality, the document management platform may segment the set of blueprint documents and the set of binary masks into sets of image crops. For example, the document management platform may segment a blueprint document into a set of image crops that overlap with each other and that are of a size that will be easier for the first data model to process. An image crop may refer to an area of a blueprint document that has been cropped (i.e., the image crop is a result of cropping an image). The document management platform may segment one or more binary masks in a similar manner.

In some implementations, the document management platform may filter the sets of image crops. For example, an image crop may include one or more pixels that are not part of a particular shape, and the document management platform may perform a filtering technique on the image crop. The filtering technique may be used to remove portions of the image crop that are not part of a particular shape and/or may include a smoothing technique for reducing image quality of the image crop. In some cases, the document management platform may filter an image crop by removing black pixels that are within a threshold distance of an edge of the image crop. For example, the image crop may include a shape and may include a line (or a part of another shape) that extends from an edge of the image crop to the shape. In this example, the document management platform may perform a filtering technique to identify a set of black pixels that are part of the line and that are within a threshold distance of an edge of the image crop, and to remove the black pixels (e.g., convert the black pixels to white pixels). In this way, the document management platform removes black pixels in the image crop that are not part of the shape, thereby allowing the document management platform to conserve resources when further processing the image crop (e.g., by not having to process black pixels that are not part of the shape).

As shown by reference number 106, the document management platform may train the first data model to identify shapes of assets within blueprint documents. For example, the document management platform may train the first data model by using one or more machine learning techniques to analyze the set of XML files that include the spatial coordinates, the set of blueprint documents that have been pre-processed, the set of binary masks that have been filtered, and/or shapes training data that identifies a labeled set of shapes that are used within the set of blueprint documents. The first data model may be a classification-based model, a regression-based model, a neural network (e.g., a convolutional neural network (CNN), a fully convolutional neural network (FCN), etc.), and/or the like. The one or more machine learning techniques may include a regression technique, a classification technique, a sliding window technique, a support vector machine (SVM) technique, a deep learning technique, and/or a similar type of technique.

In some implementations, the document management platform may train an FCN to identify shapes of assets within blueprint documents. For example, the document management platform may train an FCN by applying the set of binary masks to a set of image crops of the blueprint document and may generate heat maps that indicate likelihoods of particular shapes being in particular image crops. As an example, the document management platform may apply a binary mask for a particular shape to each crop, of the set of image crops, to generate likelihoods of each crop including the particular shape. The document management platform may repeat this process for each binary mask. This may create multiple heat maps for each crop. The document management platform may then determine a final heat map by comparing likelihoods associated with each respective heat map and identifying shapes as being within particular image crops based on the comparison. Moreover, the document management platform may compare the final heat map and the shapes training data to identify errors included within the final heat map. Next, the document management platform may update a cost function of the FCN, based on the identified errors, and may iteratively repeat one or more operations described herein until a threshold level of accuracy has been satisfied (i.e., until the final heat map matches the shapes training data or satisfies a threshold level of similarity with the shapes training data).

In this way, the document management platform trains the first data model to identify shapes of assets within blueprint documents.

Figure 1B:
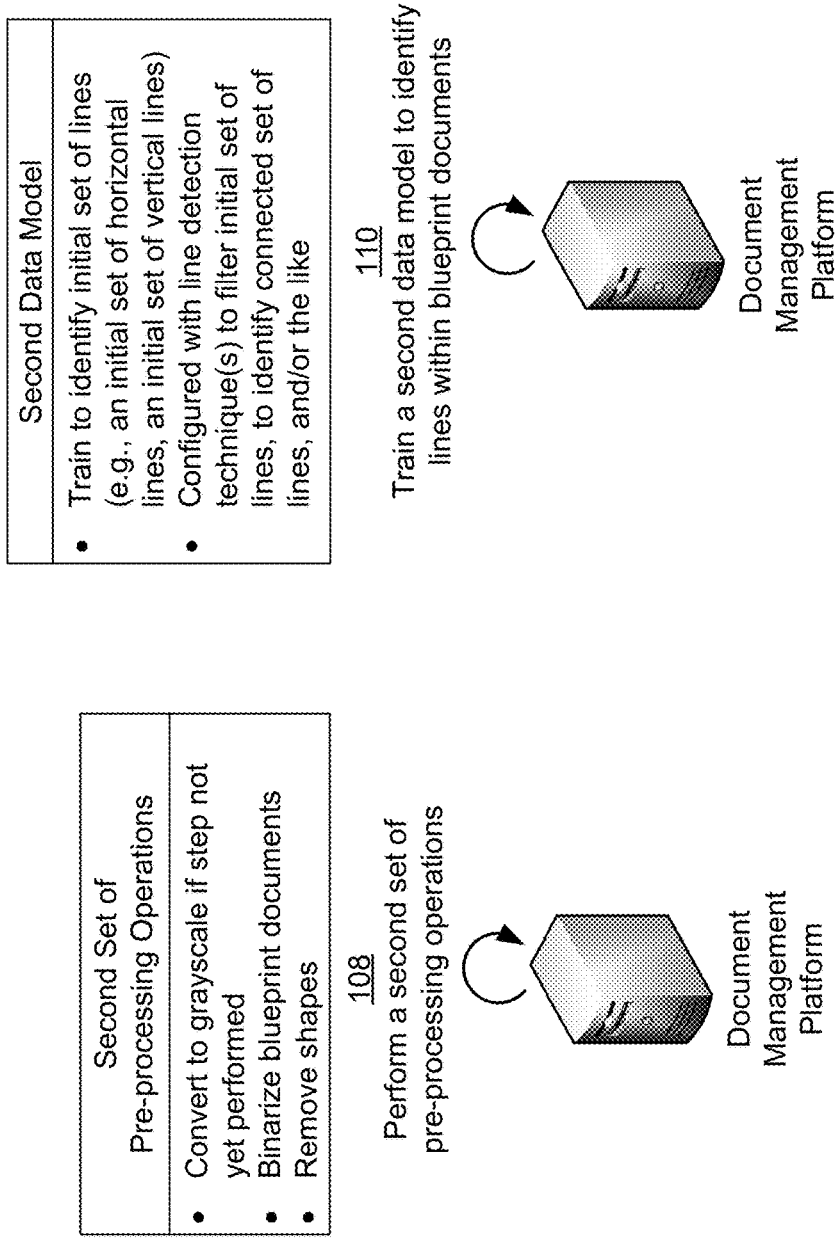

As shown in FIG. 1B, and by reference number 108, the document management platform may perform a second set of pre-processing operations. For example, the document management platform may perform a second set of pre-processing operations to convert the set of blueprint documents to a format that may be used to train a second data model. In this case, the document management platform may convert the set of blueprint documents to grayscale or to black and white (if this operation has not already been performed in connection with training another data model). Additionally, or alternatively, the document management platform may binarize the set of blueprint documents. For example, the document management platform may binarize a blueprint document by comparing pixels included in the blueprint document to a threshold value and updating particular pixel values (e.g., to a value of 0, to a value of 1 or 255, etc.) based on whether the particular pixels are associated with a color (e.g., a particular shade of gray, black, etc.) that satisfies the threshold value.

Additionally, or alternatively, the document management platform may remove the set of shapes from the binarized blueprint documents. For example, the document management platform may remove the set of shapes from the binarized blueprint documents by modifying black pixel values (e.g., by changing the black pixel values to white pixel values). In this way, the document management platform may further process the binarized blueprint documents (e.g., using one or more line detection techniques) in a manner that reduces a utilization of resources relative to further processing the binarized blueprint documents without removing the set of shapes.

As shown by reference number 110, the document management platform may train a second data model to identify an initial set of lines within blueprint documents. For example, the document management platform may train a second data model to identify an initial set of lines within a blueprint document (e.g., an initial set of horizontal lines and an initial set of vertical lines). The second data model may be a neural network, such as a convolutional neural network (CNN) and/or another type of model described herein. Additionally, the document management platform may be configured with one or more line detection techniques that are able to further process the initial set of lines to filter the initial set of lines, to identify a connected set of lines, and/or the like, as further described below.

A line (e.g., a horizontal line, a vertical line, etc.) may be digitally represented using a set of pixels within an image of a blueprint document. The set of pixels of the line may correspond to particular spatial coordinates (e.g., particular combinations of X-coordinates and Y-coordinates). As used herein, a horizontal line and a vertical line may refer to lines that are perpendicular to each other within the blueprint document. As an example, a blueprint document may be represented using four quadrants, a northwest quadrant, a northeast quadrant, a southwest quadrant, and a southeast quadrant. To provide a few examples: if a line traverses from the northwest quadrant to the southwest quadrant, the line may be said to be a vertical line. If a line traverses from the northwest quadrant to the northeast quadrant, the line may be said to be a horizontal line.

In some implementations, the document management platform may train the second data model to identify an initial set of lines within a blueprint document. For example, the document management platform may train the second data model to identify an initial group of spatial coordinates for horizontal and vertical lines included within the blueprint document. To train the second data model, the document management platform may configure the second data model with one or more rules that may be used to identify horizontal lines and/or vertical lines within the blueprint document. For example, the document management platform may configure the second data model with a rule that processes a binarized blueprint document and identifies values that represent non-white pixels and that share an X-coordinate (e.g., which may be indicative of the values corresponding to points on a horizontal line) or a Y-coordinate (e.g., which may be indicative of the values corresponding to points on a vertical line).

Additionally, or alternatively, the document management platform may train the second data model to perform one or more filtering techniques. For example, some non-white pixels may share an X-coordinate or a Y-coordinate but may not be part of a line (e.g., two neighboring non-white pixels may be part of a boundary of a shape, may be part of a dotted line, etc.). To address this, the document management platform may train the second data model to filter the initial group of spatial coordinates for the horizontal and vertical lines such that the initial group excludes spatial coordinates of neighboring pixels that do not satisfy a threshold length. Additional details regarding how one or more of these processes are performed is described in connection with FIG. 1F.

Additionally, or alternatively, and provided as another example, the document management platform may train the second data model to filter the initial group of spatial coordinates for the horizontal and vertical lines such that the initial group includes spatial coordinates for only lines that have a thickness of one pixel. For example, if a line has a thickness of five pixels, the initial group of spatial coordinates may include spatial coordinates for five rows of pixels within the technical document. In this case, the document management platform may train the second data model to select a subset of the spatial coordinates, such that the spatial coordinates are representing the line as if the line had a line thickness of one. Additional details regarding how this process is performed is described in connection with FIG. 1F.

Additionally, or alternatively, and provided as another example, the document management platform may train the second data model to filter the initial group of spatial coordinates for the horizontal and vertical lines such that the initial group includes only endpoint coordinates for the set of horizontal and vertical lines. Additional details regarding how this process is performed is described in connection with FIG. 1F.

In some implementations, the document management platform may be configured with a first group of one or more line detection techniques that are able to identify groups of two or more lines that collectively represent a single line within a blueprint document. For example, the document management platform may be configured with a line detection technique that is able to identify the groups of two or more lines that collectively represent a single line, and to update spatial coordinates for the groups of two or more lines such that the spatial coordinates represent only the single line. To provide context, in some situations, two connections to assets may intersect with each other (e.g., two pipes may intersect with each other) but may be represented differently within a blueprint document. For example, despite the intersection, the blueprint document may represent the intersecting connections by adding a small space between two lines that depict the connections, such that the two lines do not intersect. Despite the small space, it is commonly understood in some industries that these lines do in fact represent intersecting connections to various assets. To address this, the document management platform may be configured with the first group of one or more line detection techniques, as is further described in connection with FIG. 1G.

In some implementations, the document management platform may be configured with a second group of one or more line detection techniques that are able to identify background information within a blueprint document. For example, the document management platform may be configured with a line detection technique that is able to identify particular spatial coordinates for the background information within the blueprint document. Additional details regarding how this process is performed is described in connection with FIG. 1H.

In some implementations, the document management platform may be configured with a third group of one or more line detection techniques that are able to identify a set of connected lines within a blueprint document. For example, the document management platform may be configured with a line detection technique that is able to identify spatial coordinates for a set of connected lines and to further update the group of spatial coordinates to represent the set of connected lines. In this case, the document management platform may use the line detection technique to select a line and to determine whether the line is connected to any other lines by determining whether spatial coordinates for the line share an X-coordinate or a Y-coordinate with spatial coordinates associated with one or more other lines included in the set of horizontal and vertical lines. Additional details regarding how this process is performed is described in connection with FIG. 1I.

While one or more implementations are described as being performed by the second data model, it is to be understood that this provided by way of example. In practice, one or more modules and/or functions described as being part of the second data model may be performed without use of the second data model (e.g., using an rules-based approach or another type of approach). Similarly, any implementation described as being performed as separate from the second data model may be implemented using machine learning as part of the second data model.

In this way, the document management platform trains the second data model and is configured with line detection techniques that are able to identify lines within blueprint documents.

As shown in FIG. 1C, and by reference number 112, the document management platform may perform a third set of pre-processing operations. For example, the document management platform may perform a third set of pre-processing operations to convert the set of blueprint documents to a format that may be used to train the third data model that is able to identify text within the set of blueprint documents. As an example, the document management platform may convert the set of blueprint documents to grayscale or black and white and/or may binarize the set of blueprint documents (e.g., if one or more of these operations have not already been performed in connection with training another data model).

Additionally, or alternatively, the document management platform may modify the binarized blueprint documents by removing values that represent one or more connected lines. For example, a blueprint document may include a set of horizontal lines and a set of vertical lines, and one or more horizontal lines and one or more vertical lines may be connected to form a set of connected lines. To conserve processing resources when training the third data model to identify text within the blueprint document, the document management platform may remove values of a binarized version of the blueprint document (i.e., a binarized blueprint document), such that the removed values are not processed when the binarized blueprint document is processed during a training procedure. This may reduce a processing load on the document management platform when training the third data model (e.g., relative to training the third data model by processing a non-filtered version of the set of blueprint documents).

Additionally, or alternatively, the document management platform may remove the set of lines from the binarized blueprint documents. For example, the document management platform may remove the set of lines from the binarized blueprint documents by modifying black pixel values (e.g., by changing the black pixel values to white pixel values). In this way, the document management platform may further process the binarized blueprint documents (e.g., using one or more text detection techniques) in a manner that reduces a utilization of resources relative to further processing the binarized blueprint documents without removing the set of lines.

As shown by reference number 114, the document management platform may train a third data model to identify text within the set of blueprint documents. For example, the document management platform may use one or more machine learning techniques and/or text detection techniques (e.g., that perform text detection and/or recognition) to train the third data model to identify text within blueprint documents. The text may describe particular assets and/or connections depicted within blueprint documents. For example, in a piping and instrumentation (P&ID) diagram, the text may include symbols that represent particular assets and/or connections, acronyms or letters that represent the particular assets and/or connections, and/or the like. The third data model may be trained to identify text within shapes of assets, to identify text near (outside of) shapes of assets, and/or to identify text near lines that depict the connections to the assets, as further described below.

In some implementations, the document management platform may train a first module of the third data model to identify text within shapes included in a blueprint document. For example, the document management platform may be configured with or have access to the shapes training data that identifies a list of shapes that are included within particular blueprint documents. The shapes training data may indicate which text is supposed to be included within particular shapes. In this case, the document management platform may process the shapes training data to identify, for a given blueprint document, which shapes are supposed to include text, to identify one or more trends across an industry and/or a client organization (e.g., an industry or a client organization may have a practice norm that causes text to always be within a particular shape of a blueprint document), and/or the like.

Additionally, or alternatively, the document management platform may, as part of the training procedure, configure the first module to be able to identify text within the blueprint document. For example, the document management platform may generate an image crop for an area that is larger than and that includes a given shape. In this case, the document management platform may scale the image crop to improve resolution, binarize the image crop (i.e., generate an array of values that represent the image crop), perform a set of filtering techniques on the binarized image crop to eliminate aspects of the binarized image crop that do not need to be processed, and may perform a text recognition technique to identify the text that is within the given shape (and which may correspond to particular spatial coordinates). Additional details regarding one or more of these operations are provided in connection with FIG. 1J.

Additionally, or alternatively, the document management platform may train a second module of the third data model to identify text near the shapes that are included in a blueprint document. For example, if the document management platform determines that text for a given shape is often located near the given shape (but not inside of the given shape), the document management platform may generate a set of image crops for one or more areas around the given shape. As a specific example, the document management platform may generate four image crops, an image crop for an area that is a threshold distance above the given shape, an image crop for an area that is a threshold distance below the given shape, an image crop for an area that is a threshold distance to the left of the given shape, and an image crop for an area that is a threshold distance to the right of the given shape. Additionally, the document management platform may identify text near the given shape using one or more techniques described above (e.g., scale the set of image crops, binarize the set of image crops, perform the set of filtering techniques, perform the text recognition technique, etc.).

Additionally, or alternatively, the document management platform may train a third module of the third data model to identify text near lines that are included in a blueprint document. For example, the document management platform may, while training the second data model, have identified connected lines within the blueprint document. In this case, the document management platform may, for each connected line, generate a set of image crops for one or more areas around the connected lines. As a specific example, the document management platform may generate two sets of image crops, a first set of image crops for an area that includes at least part of a line and that is a threshold distance above the line, and a second set of image crops for an area that includes at least a part of the line and that is a threshold distance below the line. This may allow the document management platform to use one or more techniques described above to identify text that is located near the line.

In this way, the document management platform trains the third data model to identify text within blueprint documents.

Figure 1D:
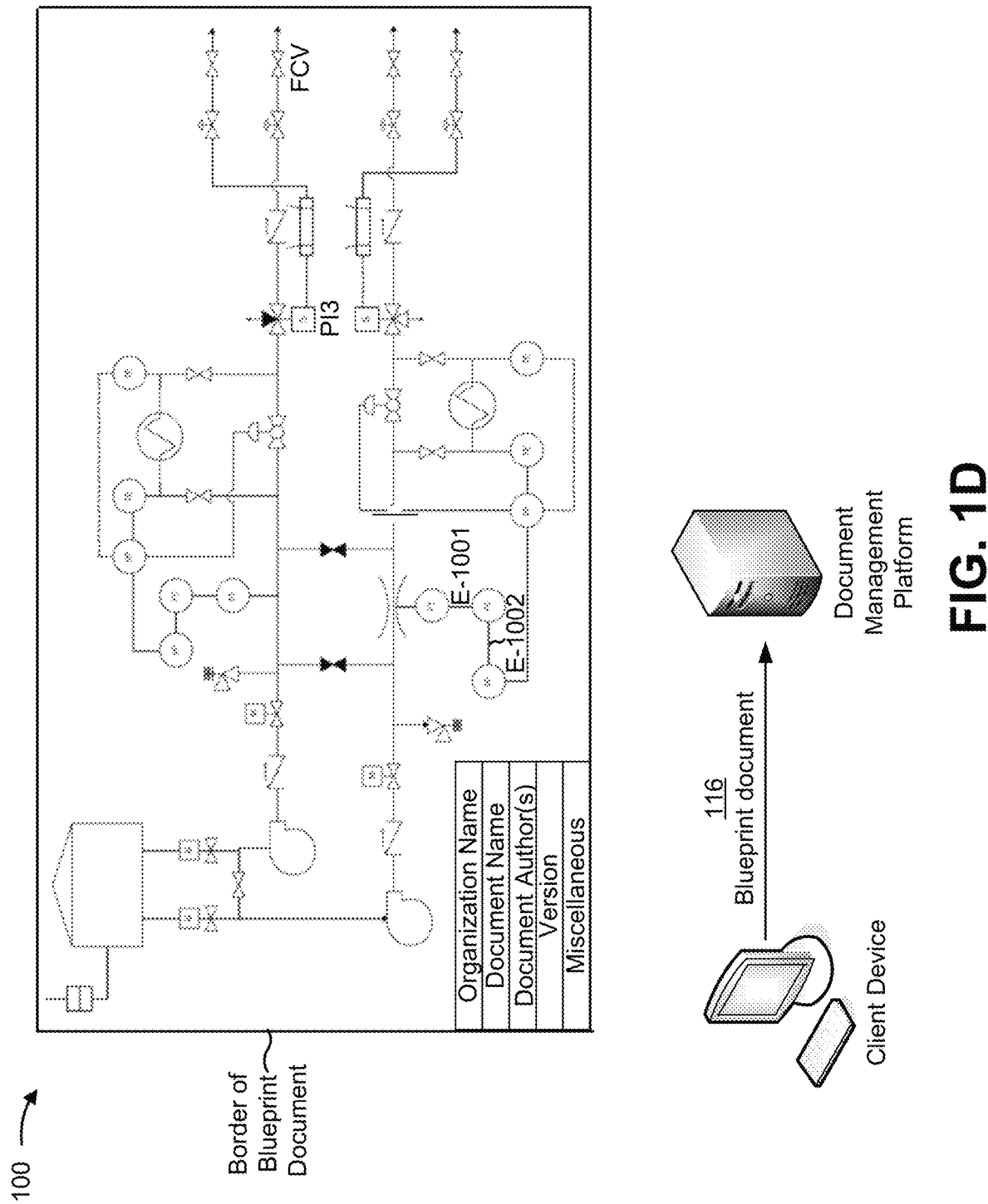

As shown in FIG. 1D, and by reference number 116, the document management platform may receive a blueprint document. For example, the document management platform may receive a blueprint document that includes content, such as a set of shapes that depict assets, a set of lines that connect to the set of shapes, and text that describes particular assets and/or connections that are depicted within the blueprint document. Types of blueprint documents and/or types of content included within blueprint documents is defined elsewhere herein (see, e.g., FIGS. 1A-1C).

In some implementations, the document management platform may receive a blueprint document that is part of a request from a client device. For example, a user may interact with the client device to access an interface of an application or a website that allows the user to submit a request to digitize the blueprint document, to intelligently associate content within the blueprint document, to correct one or more errors within the blueprint document, to obtain summary statistics relating to the content and/or quality of the blueprint document, and/or the like. The request may allow content within the blueprint document (e.g., shapes, lines, text, etc.) to be modifiable and/or searchable by users, may ensure the content is consistent with other documents (e.g., within an organization, across an industry, etc.), may improve accuracy of the content within the blueprint document, may assist with audits involving the blueprint document, and/or the like. When the user submits the request, the request may be provided to the document management platform.

In some implementations, the document management platform may receive a blueprint document via one or more means other than a request. For example, the client device may be configured to automatically transmit the blueprint document to the document management platform (e.g., periodically over an interval, based on a trigger, and/or the like). Additionally, or alternatively, the document management platform may monitor a channel for blueprint documents that are uploaded by the client device and may download and begin processing blueprint documents as soon as the download is completed.

In this way, the document management platform receives a blueprint document for further processing.

Figure 1E:
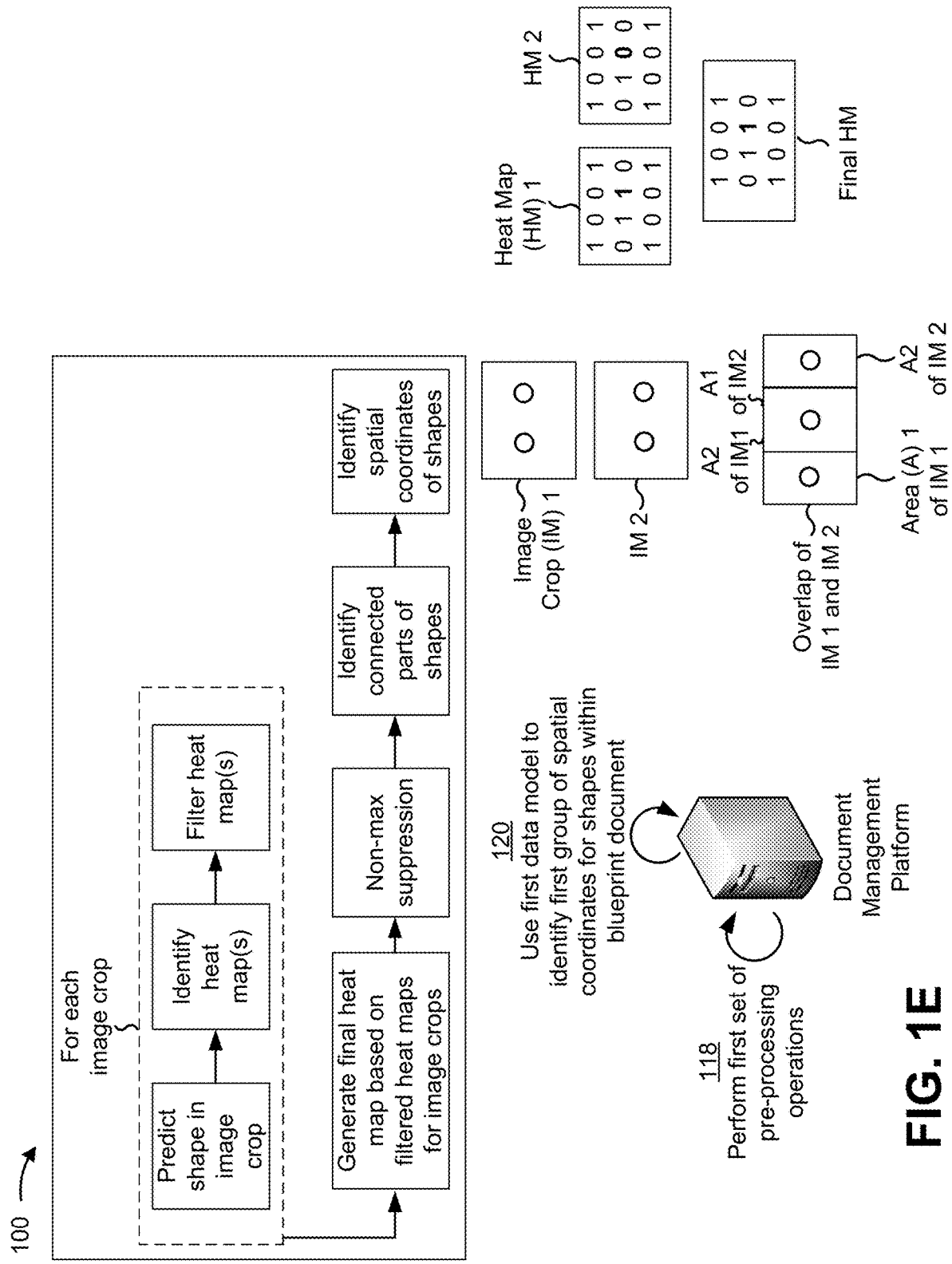

As shown in FIG. 1E, and by reference number 118, the document management platform may perform the first set of pre-processing operations to convert the blueprint document to a format that may be processed by the first data model. For example, the document management platform may convert the blueprint document to the uniform format (e.g., an image format), may convert the blueprint document to grayscale (or to black and white), may identify or generate a data structure with spatial coordinates that correspond to the blueprint document, may generate a set of image crops that overlap and that are of a size that will be easier for the first data model to process, may filter the set of image crops, and/or the like, as described in further detail elsewhere herein.

As shown by reference number 120, the document management platform may use the first data model to identify a first group of spatial coordinates for shapes of assets that are depicted within the blueprint document. For example, the document management platform may provide the set of image crops as input to an FCN to cause the FCN to generate a set of heat maps that indicate likelihoods of particular shapes being in particular image crops. A heat map may be a matrix or array of values, whereby each value indicates a likelihood (e.g., a decimal value between zero and one) of a pixel within a given image crop being part of a particular shape. Heat maps may be generated for each image crop (where a heat map corresponds to a particular shape that was identified when training the FCN).

Additionally, the document management platform may, for each image crop, filter the set of heat maps to remove noise. For example, the document management platform may filter black pixels that are within a threshold area of an edge of an image crop. As a specific example, assume the image crop includes a shape of a triangle in the middle of the image crop and includes a line that connects from an edge of the image crop to the shape of the triangle. In this example, the document management platform may filter the black pixels that are part of the line and that are within a threshold distance of the edge (e.g., by updating values of the black pixels from values of 0 to values corresponding to white pixels, such as values of 1, values of 255, and/or the like.

Additionally, the document management platform may generate a final heat map based on the filtered heat maps. In the example shown in FIG. 1E, a first image crop may include a first area and a second area, and a second image crop may include a first area and a second area, where the second area of the first image crops overlaps with the first area of the second image crop. In this case, the blueprint document may have generated a first heat map for the first image crop and a second heat map for the second image crop. This may cause the document management platform to include, as part of the final heat map, heat map values that correspond to the first area of the first image crop (e.g., the first two columns of values of the first heat map) and heat map values that correspond to the second area of the second image crop (e.g., the third and fourth columns of values of the second heat map). In cases where the image crops overlap (e.g., the second area of the first image crop and the first area of the second image crop), the document management platform may perform a non-max suppression technique to include, as part of the final heat map, highest-available heat map values that correspond to a particular overlapping part of the image crops. As an example, if the first heat map includes a value of one for a pixel included in the second area of the first image crop, and the second heat map includes a value of zero for the same pixel, the document management platform may include the value of one as part of the final heat map.

In some implementations, the document management platform may use the final heat map to identify the first group of spatial coordinates for the set of shapes within the blueprint document. For example, the document management platform may identify groups of values within the final heat map that correspond to clusters of pixels, whereby each cluster represents a particular shape. In some cases, the groups of values within the heat map (and/or the clusters of pixels) may satisfy a threshold confidence level that each respective group of values (and/or cluster) is representative of a particular shape. Next, the document management platform may identify, as the first group of spatial coordinates for the set of shapes, particular spatial coordinates that map to the identified groups of values (and/or to the clusters of pixels).

In some implementations (not shown), the document management platform may identify spatial coordinates for combinations of shapes. For example, the blueprint document might include shapes that depict multiple types of valves. In this case, the document management platform may identify that multiple types of valves are used within the blueprint document and may identify a particular group of spatial coordinates that identifies all values and/or groups of spatial coordinates that identify specific types of valves. In this way, a user may be able to interact with a user interface to search a digitized copy of the blueprint document for locations within the blueprint document of a specific type of valve, for locations within the blueprint document of all valves, and/or the like.

In this way, the document management platform uses the first data model to identify the first group of spatial coordinates for the set of shapes within the blueprint document.

Figure 1F:
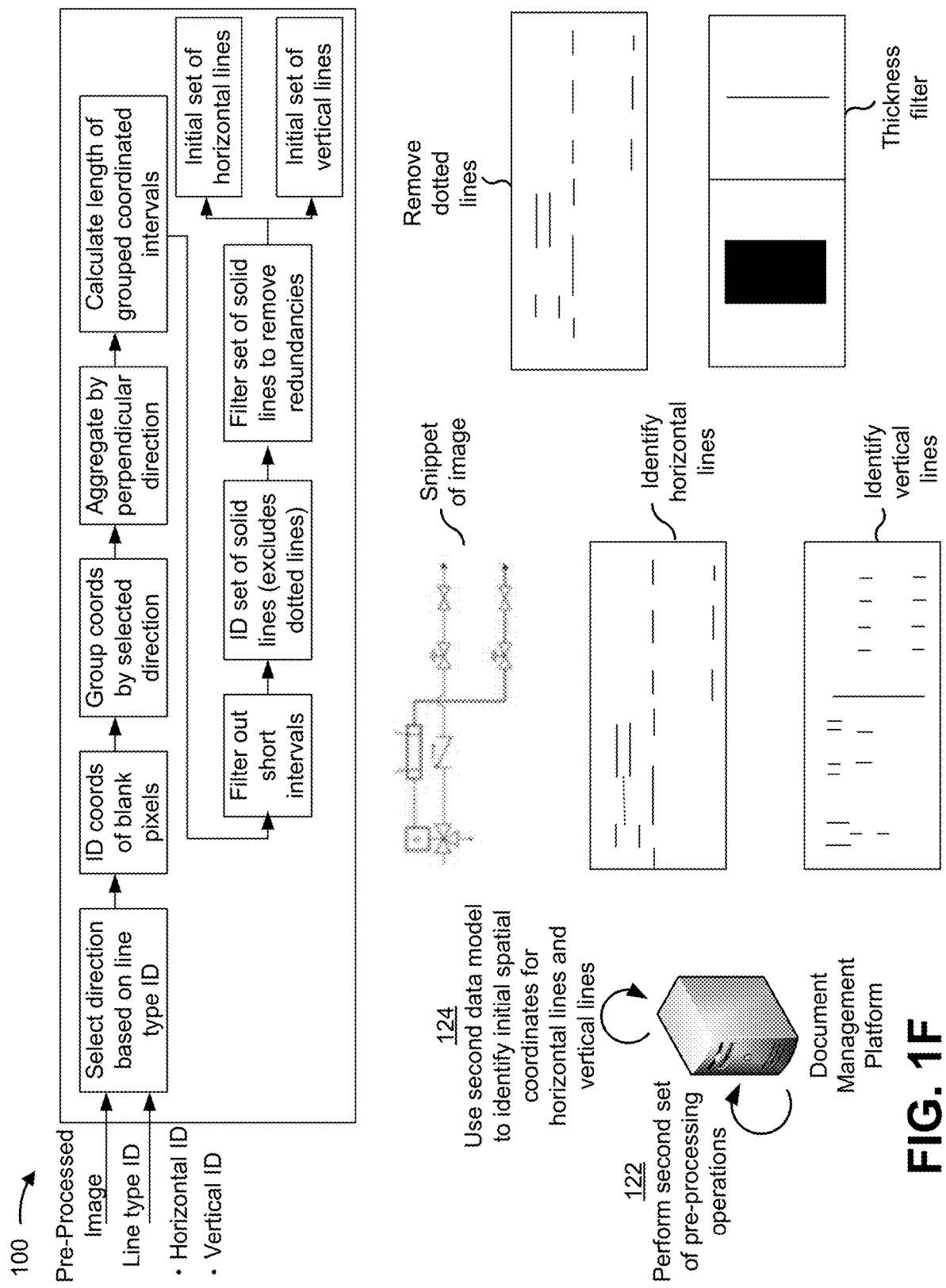
Figure 1G:
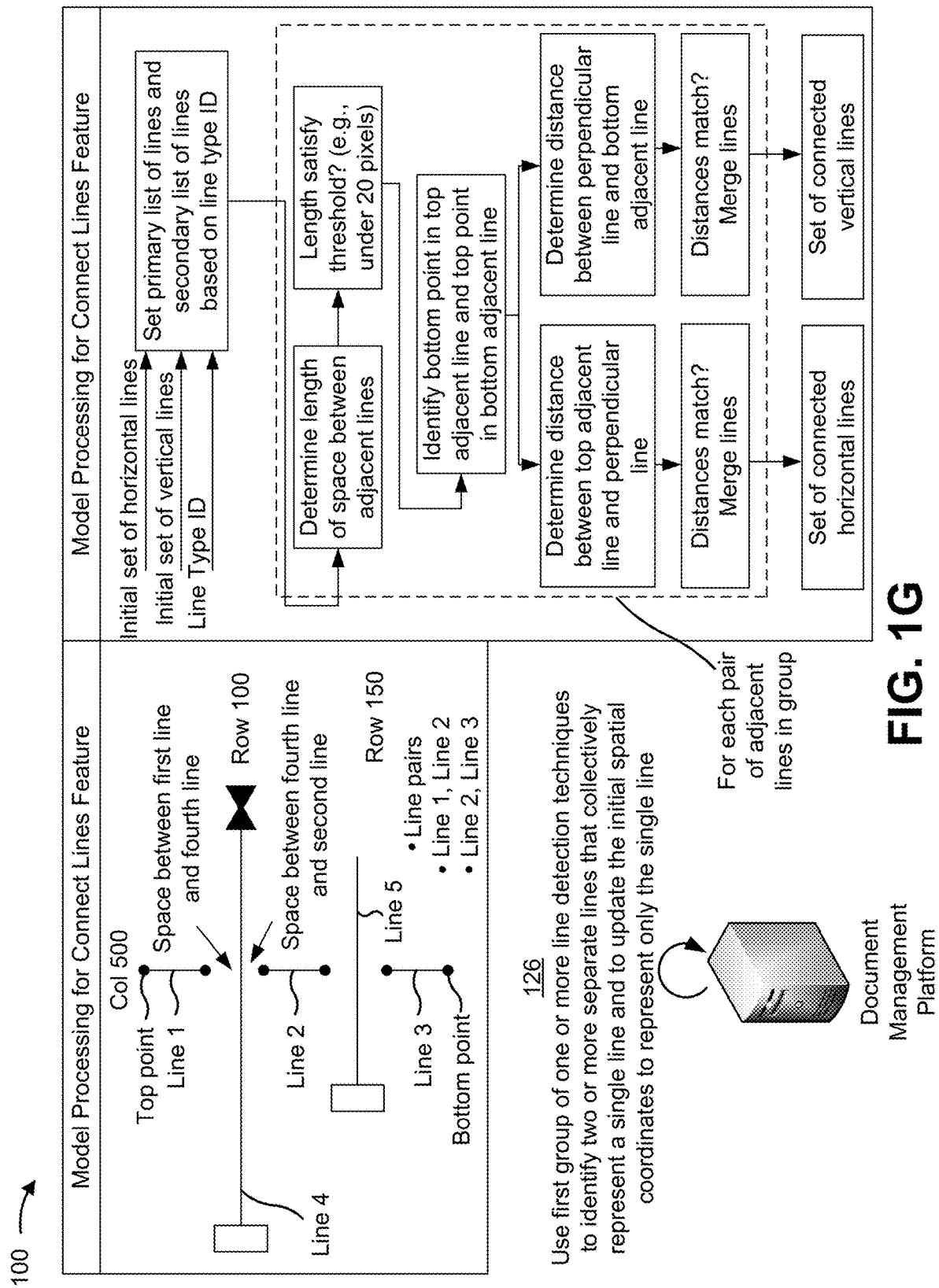
Figure 1H:
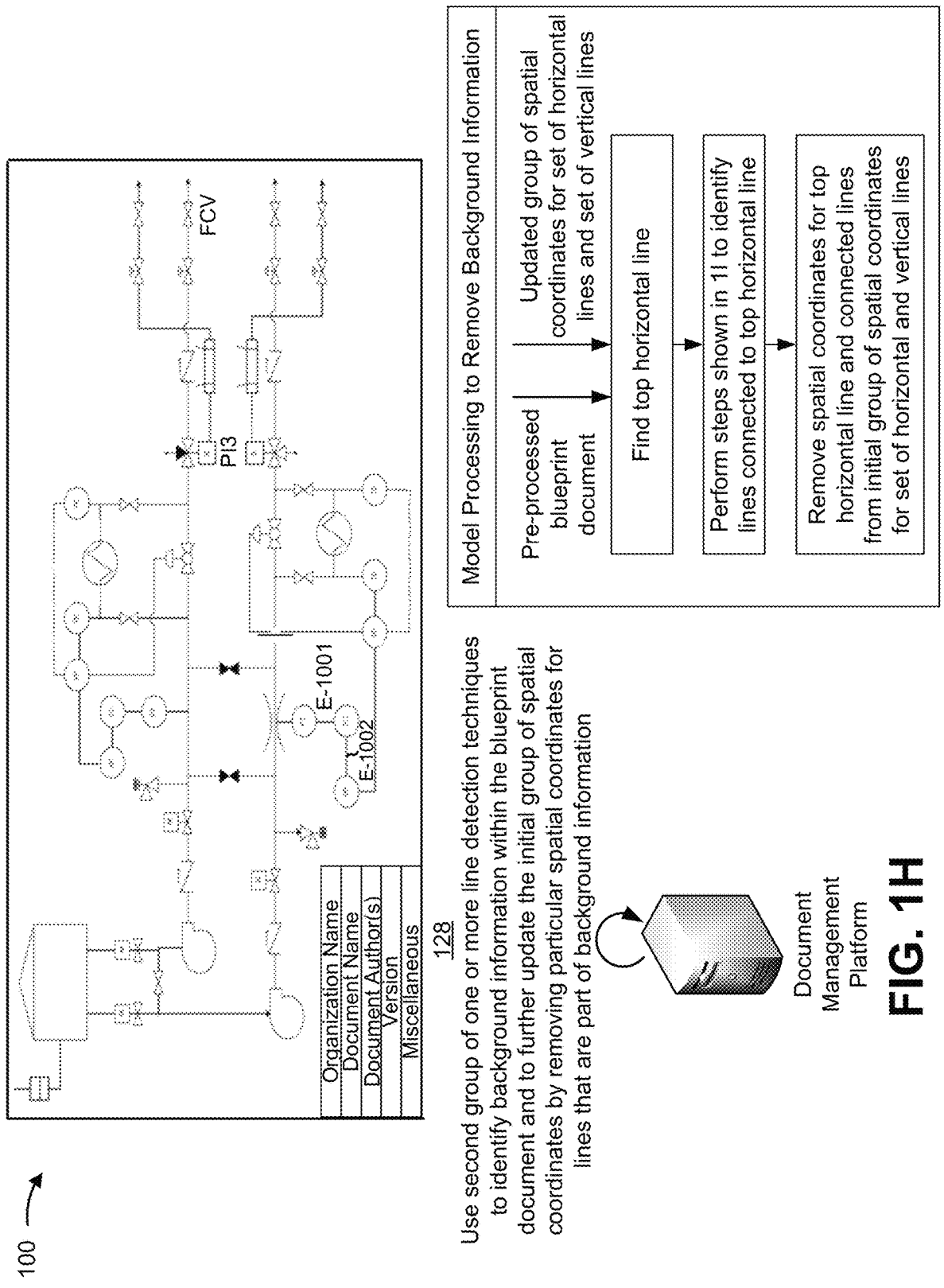
Figure 1I:
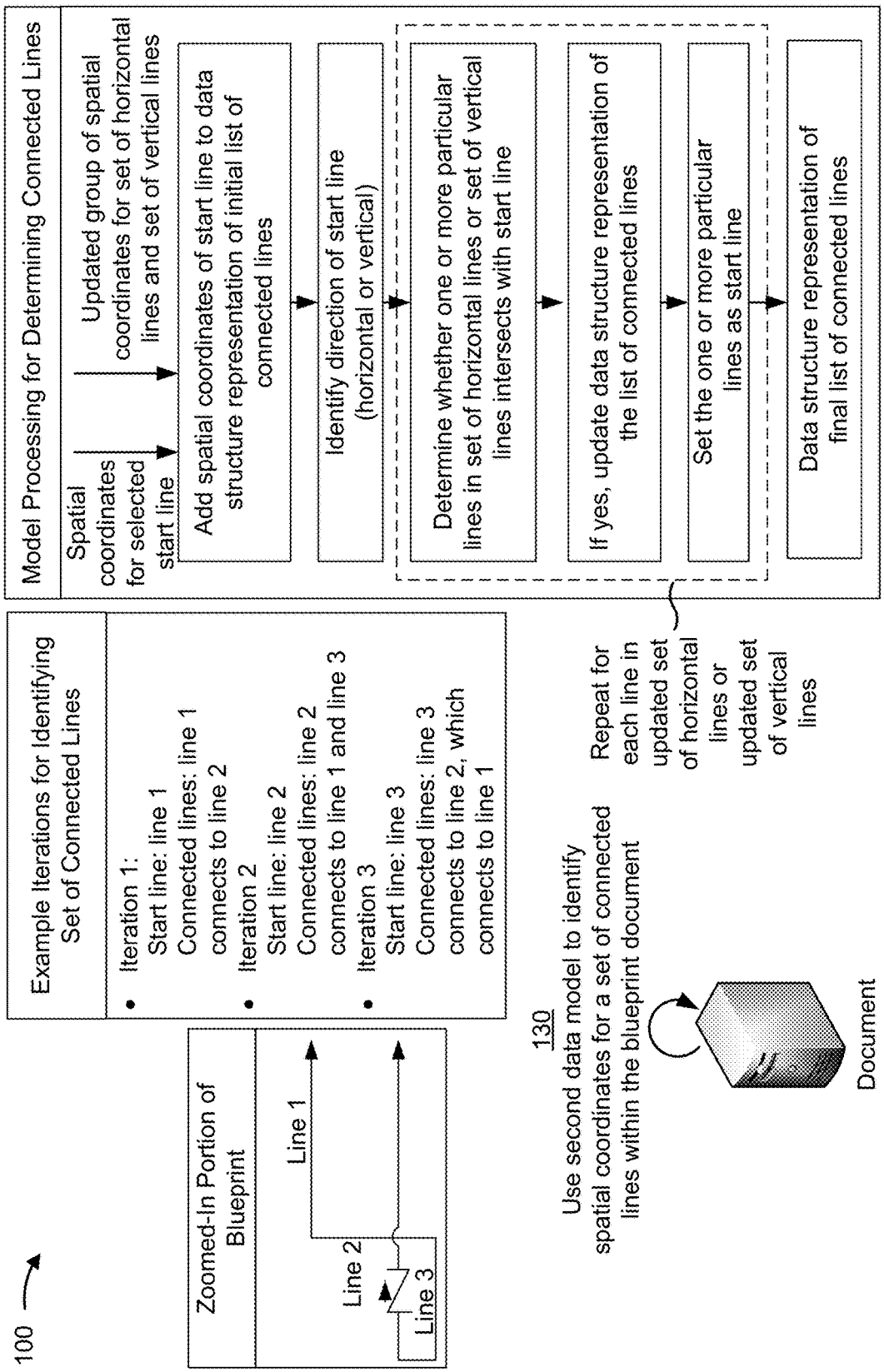

As shown in FIGS. 1F-1I, the document management platform may perform one or more actions to identify a second group of spatial coordinates for a set of lines within the blueprint document. As shown in FIG. 1F, the document management platform may identify a set of horizontal lines and a set of vertical lines. As shown in FIG. 1G, the document management platform may identify two or more separate lines that collectively represent a single line. As shown in FIG. 1H, the document management platform may identify background information within the blueprint document (e.g., information that is part of a legend, etc.). As shown in FIG. 1I, the document management platform may identify a set of connected lines within the blueprint document.

As shown in FIG. 1F, and by reference number 122, the document management platform may perform the second set of pre-processing operations to convert the blueprint document to a format capable of being processed by the second data model. For example, the document management platform may convert the set of blueprint documents to grayscale or black and white (if this operation has not already been performed in connection with pre-processing for another data model) and may binarize the blueprint document, using one or more techniques described elsewhere herein. Additionally, it is to be understood that the array that represents the binarized blueprint document (e.g., which includes values of 0 for non-white pixels and values of 1 or 255 for white pixels) may map to the spatial coordinates of the blueprint document (e.g., such that each value in the array maps to a pair of X-Y spatial coordinates).

As shown by reference number 124, the document management platform may use the second data model to identify an initial group of spatial coordinates for a set of horizontal lines and for a set of vertical lines that are included within the blueprint document. For example, the document management platform may provide, as inputs to the second data model (e.g., a neural network), the binarized blueprint document (e.g., which maps to spatial coordinates) and a line type identifier, such as a horizontal line type identifier or a vertical line type identifier. This may cause the second data model to process the input (further described below) and to output initial spatial coordinates for the set of horizontal lines or initial spatial coordinates for the set of vertical lines (e.g., depending on the line type identifier that was used as input). While one or more implementations below refer to the set of horizontal lines, this is provided by way of example. In practice, the document management platform may perform one or more of the techniques described herein twice, such that the second data model is able to output the initial spatial coordinates for both the set of horizontal lines and the set of vertical lines.

To process the input, the document management platform may reference the binarized blueprint document to identify clusters of values that represent non-white pixels and that share an X-coordinate or a Y-coordinate (e.g., non-white pixels that share a row or a column in the blueprint document). In this case, the document management platform may, for each cluster of values, determine a length of each cluster and may filter each cluster that satisfies (or fails to satisfy) a threshold length value. For example, there may be pixels within the blueprint document that share an X-coordinate but that are not part of a horizontal line (e.g., two pixels that are part of an edge of a shape may share an X-coordinate but are not part of a horizontal line). In this case, the document management platform may identify a cluster of values in the binarized blueprint document and may determine that the cluster of values does not satisfy the threshold length value (e.g., which may be set to a minimum threshold length, such as two pixels, five pixels, ten pixels, etc.).

Additionally, the document management platform may, based on determining that the length does not satisfy the threshold length value, filter the cluster of values such that the cluster of values is not identified as a horizontal line. If the cluster of values does satisfy the threshold length value, then the document management platform may identify, as part of the initial spatial coordinates for the set of horizontal lines, particular spatial coordinates for the clusters of values that have lengths that satisfy the threshold length value. One or more additional filtering techniques may further reduce the initial spatial coordinates for the set of horizontal lines, as described below.

In some implementations, the document management platform may filter the clusters of values by removing particular clusters that represent dotted lines. For example, because dotted lines often have a special meaning within blueprint documents, the document management platform may be configured to identify spatial coordinates for solid lines (e.g., horizontal lines and/or vertical lines) but to ignore spatial coordinates for dotted lines.

As an example, the document management platform may sort clusters of values that share an X-coordinate into cluster groups (i.e., based on the clusters of values being part of the same row). In some cases, the document management platform may determine a length for each cluster group and may compare lengths to each other. If one or more of the lengths are the same or satisfy a threshold level of similarity, then the document management platform may identify corresponding cluster groups as being part of a dotted line. This may cause the document management platform to filter the dotted line such that spatial coordinates of the dotted line are not included in the initial spatial coordinates for the set of horizontal lines. Additionally, or alternatively, the document management platform may compare a distance between neighboring cluster groups and may identify the cluster groups as being part of a dotted line based on each distance being equal (or satisfying a threshold distance). For example, if a dotted line has ten line segments, the document management platform may identify ten cluster groups and may determine a distance between each neighboring cluster group. If the distance between each neighboring cluster group matches, the document management platform may identify the cluster groups (e.g., which are part of particular line segments in the dotted line) as being part of a dotted line and may filter the dotted line as described above.

In some implementations, the document management platform may identify a line (e.g., a horizontal line and/or a vertical line) that has a thickness of two or more pixels. For example, the document management platform may identify five clusters of values (e.g., one per row of pixels) as an aggregated cluster of values, based on the five clusters of values sharing neighboring Y-coordinates.

Furthermore, the document management platform may filter the aggregated cluster of values such that the horizontal line is represented by only one cluster of values of the aggregated cluster of values. For example, the document management platform may change particular clusters of values to values of zero such that only one cluster of values, of the five clusters of values, includes values associated with non-white pixels (e.g., values of zero). In this case, the document management platform may identify, as part of the initial spatial coordinates for the set of horizontal lines, spatial coordinates that correspond to the cluster of values that include the values of zero. In this way, the document management platform conserves processing resources relative to processing all (or some) of the clusters of values associated with the horizontal line.

In some implementations, the document management platform may update the data structure that stores the initial group of spatial coordinates such that endpoint coordinates are stored via the data structure and intermediary coordinates are discarded. For example, the document management platform may filter the initial spatial coordinates to include spatial coordinates for endpoint coordinates of particular lines and to exclude spatial coordinates for intermediary points within the particular lines. For example, a horizontal line may correspond to spatial coordinates (1,1), (1,2), . . . , (1,100). In this case, the document management platform may filter the spatial coordinates of the horizontal line such that that spatial coordinates for the horizontal line are stored as (1,1), (1,100). In this way, the document management platform conserves processing resources and/or memory resources by reducing a quantity of data that may be utilized for additional processing.

In this way, the document management platform identifies the initial group of spatial coordinates for the set of horizontal lines and the set of vertical lines.

As shown in FIG. 1G, and by reference number 126, the document management platform may use the first group of one or more line detection techniques to identify two or more separate lines that collectively represent a single line and to update the initial spatial coordinates to represent only the single line. To identify two or more separate lines that might collectively represent a single line, the document management platform may, for a column of pixels within the blueprint document (i.e., a group of pixels that share an x coordinate), identify a number of lines in the column. Using the example shown in FIG. 1G, the document management platform may, for a $500^{th}$ column of the blueprint document, identify a first line (shown as Line 1), a second line (shown as Line 2), and a third line (shown as Line 3). To determine whether the two or more separate lines do in fact collectively represent a single line, the document management platform may, for each adjacent pair of lines, determine whether a perpendicular line separates the adjacent pair of lines and may determine a distance between each line, in the adjacent pair of lines, and the perpendicular line. In the example shown, the document management platform may determine that a first adjacent pair of lines (Line 1 and Line 2) are separated by a first perpendicular line (Line 4) and that a second adjacent pair of lines (Line 2 and Line 3) are separated by a second perpendicular line (Line 5).

Additionally, the document management platform may determine distances between each respective line included in an adjacent line pair and a corresponding perpendicular line. For example, the document management platform may determine a distance between Line 1 and Line 4, a distance between Line 4 and Line 2, a distance between Line 2 and Line 5, and a distance between Line 5 and Line 3. The distance may be measured using spatial coordinates.

Furthermore, the document management platform may determine whether distances between each respective adjacent line and the corresponding perpendicular line match and/or satisfy a threshold distance (e.g., five pixels, ten pixels, twenty pixels, etc.). For example, the document management platform may determine whether a first distance between a first adjacent line and a perpendicular line matches a second distance between a second adjacent line and the perpendicular line to verify that the first and second adjacent line are part of the same line. As another example, the document management platform may need to filter out adjacent pairs of lines that have large distances between them because a large distance between two lines may be indicative of the two lines being two unique, separate lines (and not two lines that collectively represent a single line). This is why the document management platform may set a threshold distance and may determine whether each distance satisfies the threshold distance.

If the threshold distance is not satisfied, the document management platform may stop processing the adjacent pair of lines. If the threshold distance is satisfied, the document management platform may determine that the adjacent pair of lines are collectively representing a single line. If there is more than one pair of adjacent lines (e.g., as shown), the document management platform may determine whether the adjacent pairs of lines are consecutive (i.e., not separated by another adjacent pair of lines that failed to satisfy the threshold distance). If the adjacent pairs of lines are consecutive, the document management platform may determine that the adjacent pairs of lines are all part of the single line. Furthermore, the document management platform may identify a set of endpoint coordinates for the single line. For example, the document management platform may identify a first set of endpoint coordinates associated with an uppermost point of the single line and may identify a second set of endpoint coordinates associated with a lowermost point of the single line.

In the example shown, the document management platform may determine that Line 1, Line 2, and Line 3, represent a single line. Additionally, the document management platform may identify sets of endpoint coordinates for the single line, such as by identifying a first set of endpoint coordinates for the single line (shown as a "Top Point" of Line 1) and identifying a second set of endpoint coordinates for the single line (shown as "Bottom Point" of Line 3). In some cases, the first and second set of endpoint coordinates may be stored in association with an identifier for the single line. The operations described above may be repeated for each column of pixels (e.g., to identify all (or some) adjacent pairs of lines that collectively represent single lines in a vertical direction) and for each row of pixels (e.g., to identify all (or some) adjacent pairs of lines that collectively represent single lines in a horizontal direction).

In this way, the document management platform identifies spatial coordinates for separate lines that collectively represent a single line within the blueprint document.

As shown in FIG. 1H, and by reference number 128, the document management platform may use the second group of one or more line detection techniques to identify background information within the blueprint document and to further update the initial group of spatial coordinates by removing particular spatial coordinates for the background information. The background information may include an organization name, a document name, a document author, a version, miscellaneous information, and/or the like. In some cases, the background information may be a stamp that is placed on to the blueprint document (e.g., such that the stamp connects to an edge of the blueprint document).

To identify the background information, the document management platform may provide, as input to the third module, the pre-processed image of the blueprint document and the updated group of spatial coordinates for the set of horizontal lines and the set of vertical lines. This may cause the third module to identify an upper-most horizontal line within the blueprint document, to identify lines connected to a configured or specified line (e.g., the upper-most horizontal line, which may be identified using operations described in connection with FIG. 1I), and to identify the background information that is connected to the lines connected to the configured or specified line. This is because the background information may be located at various boundaries of the blueprint document and will remain unconnected to the other lines found within the blueprint document.

In some implementations, the document management platform may remove, from the updated group of spatial coordinates, the spatial coordinates for the configured or specified line, for the lines connected to the configured or specified line, and for the background information. For example, as described in connection with FIG. 1G, the updated group of spatial coordinates may correspond to locations of lines within the blueprint document. However, because the background information is static information and not substantive content that is part of the blueprint document, the lines associated with the background information do not need to be further processed by one or more of the line detection techniques described herein. Therefore, by removing spatial coordinates for the background information from the updated group of spatial coordinates, the document management platform conserves resources that would have otherwise be wasted attempting to perform one or more additional line detection techniques on the portion of the blueprint document that includes the background information.

In this way, the document management platform updates the initial group of spatial coordinates by removing particular spatial coordinates for the background information within the blueprint document.

As shown in FIG. 1I, and by reference number 130, the document management platform may use the third set of one or more line detection techniques to identify spatial coordinates for a set of connected lines within the blueprint document. The set of connected lines may include two or more lines that are connected to each other in the blueprint document, and may include horizontal lines connecting to vertical lines, vertical lines connecting to horizontal lines, and/or the like.

To identify the spatial coordinates that represent the set of connected lines, the document management platform may select a line within the blueprint document (e.g., a horizontal line, a vertical line, etc.), and may use the third group of one or more line detection techniques to process spatial coordinates for the selected line and the updated group of spatial coordinates for the set of horizontal lines and the set of vertical lines. This may allow the document management platform to determine whether the selected line connects to one or more other lines. In this case, the document management platform may determine whether spatial coordinates for the selected line intersect with spatial coordinates for one or more other lines. If one or more particular lines share spatial coordinates with the selected line, the document management platform may identify the start line and the one or more particular lines as being part of a connected line and may update a data structure in a manner that associates the spatial coordinates of the start line and the spatial coordinates of the one or more particular lines). Additionally, the document management platform may select the one or more particular lines as the start line and may iteratively repeat this process until spatial coordinates for the set of connected lines for the entire blueprint document have been identified.

In this way, the document management platform identifies spatial coordinates for the set of connected lines within the blueprint document.

Figure 1J:
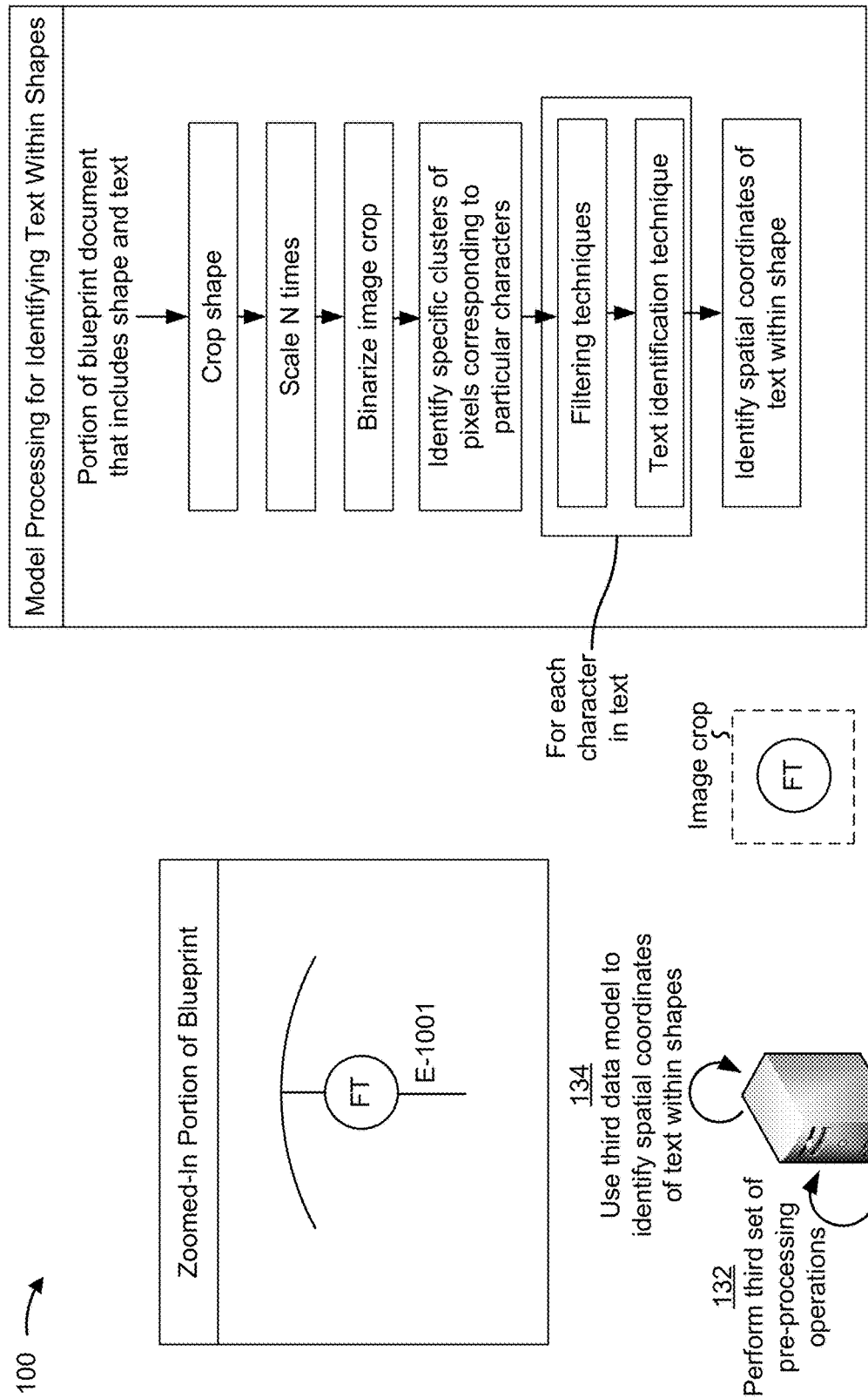

As shown in FIGS. 1J-1L, the document management platform may identify a third group of spatial coordinates for text within the blueprint document. For example, the document management platform may use the third data model to identify spatial coordinates of text that is located near the set of shapes, spatial coordinates for text that is located within particular shapes, and spatial coordinates for text that is located near the set of lines, as each described below.

As shown in FIG. 1J, and by reference number 132, the document management platform may perform the third set of pre-processing operations to convert the blueprint document to a format that may be processed by the third data model. For example, the document management platform may perform the third set of pre-processing operations, which are described in connection with FIG. 1C. As an example, the document management platform may remove one or more connected pixels from the blueprint document (e.g., pixels associated with shapes, lines, and/or the like). In this case, the document management platform may remove one or more connected pixels from the blueprint document by performing a filtering technique to change black pixel values (e.g., values of 0) to white pixel values (e.g., values of 1 or 255).

As shown by reference number 134, the document management platform may use the third data model to identify, as part of the third group of spatial coordinates, spatial coordinates for text that is located within one or more shapes within the blueprint document. For example, the document management platform may, for each shape identified within the blueprint document, verify whether each shape is supposed to include text, and may use the first module of the third data model to identify spatial coordinates for the text located within the one or more shapes, as described in detail below.

In some implementations, to identify text within a shape, the document management platform may generate an image crop for an area that includes the shape, may modify a size of the image crop to improve a resolution (e.g., by two times a current image crop size, five times the current image crop size, ten times the current image crop size, etc.), and may binarize the image crop. In some implementations, the document management platform may identify specific clusters of pixels corresponding to particular characters. In the example shown, the document management platform may identify a first cluster of pixels corresponding to the circle, a second n cluster of pixels corresponding to the character F, and a third cluster of pixels corresponding to the character T.

In some implementations, the document management platform may perform the set of filtering techniques on the binarized image crop (e.g., on each identified cluster of pixels). For example, the document management platform may perform a filtering technique to identify a set of black pixels that are connected to one or more edges of the binarized image crop and may filter the identified set of black pixels (e.g., by updating values of the black pixels from values of zero to values of one). In the example shown, the document management platform may perform the filtering technique to filter black pixels corresponding to the circle. Additionally, or alternatively, the document management platform may remove one or more characters within the binarized image crop. In the example shown, the document management platform may identify a first cluster of pixels corresponding to the circle and the circle may be mistakenly identified as the letter O. To prevent this from happening, the document management platform may perform another filtering technique that is able to identify that the first cluster of pixels collectively represent a shape that has a size that is greater than a threshold size and may filter the first cluster of pixels (e.g., by updating pixel values from black pixel values to white pixel values).

Additionally, or alternatively, the document management platform may perform an erosion technique to reduce a width of one or more letters represented by the binarized image crop. For example, the document management platform may perform an erosion technique to identify clusters of values in an array that represent black pixels corresponding to a particular character and may remove one or more of the clusters of values from the array. This may allow the document management platform to perform subsequent processing in a manner that conserves processing resources relative to solutions that do not utilize one or more of the set of filtering techniques.

In some implementations, the document management platform may perform a text recognition technique to identify spatial coordinates for the text that is within the given shape. For example, the array of values for the binarized image crop that has been filtered may map to a group of spatial coordinates within the blueprint document, and document management platform may perform a text recognition technique (e.g., a tesseract technique, an OCR technique, and/or the like) to identify text within a portion of the blueprint document that corresponds to the group of spatial coordinates. This may allow the document management platform to identify spatial coordinates for the text that is within the given shape.

As shown as an example, the blueprint may include the text "FT" inside a circle that is part of the blueprint document. In this example, the document management platform may generate an image crop for an area around the text FT and may increase a size of the image crop to improve resolution. Next, the document management platform may generate a binarized image crop and may identify two groups of values within the binarized image crop (e.g., a first group of values that represent the character F and a second group of values that represent the character T). In this case, the document management platform may perform the set of filtering techniques to remove the black pixels associated with the circle around the text FT, to reduce a width of the letters FT, and/or the like. Furthermore, the document management platform may perform the text recognition technique to determine that the text includes the character F and the character T.

In some implementations, the document management platform may store the spatial coordinates of the identified text identified. For example, the document management platform may store the spatial coordinates of the text in a manner that associates the spatial coordinates with the text and/or text identifiers for the text with shape identifiers of shapes that the text is included within, an identifier associated with text being within a shape (as opposed to near the shape, which may be assigned a different identifier), and/or the like.

In this way, the document management platform identifies spatial coordinates of text within one or more of the shapes within the blueprint document.

As shown in FIG. 1K, and by reference number 136, the document management platform may use the third data model to identify, as part of the third group of spatial coordinates, spatial coordinates for text that is located near the set of shapes. For example, if the document management platform determines that a given shape is not supposed to have text (and/or determines that the given shape often has text nearby but not within it), the document management platform may use the second module of the third data model to identify spatial coordinates of text located near the given shape, as further described below.

In some implementations, the document management platform may generate a set of image crops for one or more areas around a given shape. In the example shown, the characters FCV may be located near the given shape. In this example, the document management platform may generate four image crops for four overlapping areas around the given shape. Additionally, the document management platform may identify spatial coordinates of text near the given shape using one or more techniques described above (e.g., scale the set of image crops, binarize the set of image crops, perform the set of filtering techniques (which may include identifying duplicate characters that are found in multiple image crops), perform the text recognition technique, and/or the like).

In some implementations, the document management platform may store the spatial coordinates for the text that is identified as being located near one or more shapes. For example, the document management platform may store the spatial coordinates of the text in a manner that associates the spatial coordinates with the text and/or text identifiers for the text with shape identifiers of shapes that the text is near, an identifier associated with text being near a shape but not within the shape, and/or the like.

In this way, the document management platform identifies text near one or more shapes within the blueprint document.

As shown in FIG. 1L, and by reference number 138, the document management platform may use the third data model to identify, as part of the third group of spatial coordinates, spatial coordinates of text near one or more lines within the blueprint document. For example, the document management platform may have previously identified the second group of spatial coordinates for the set of connected lines within the blueprint document and may use the third module of the third data model to identify spatial coordinates of text located near one or more lines that are included in the set of connected lines, as further described below.

In some implementations, the document management platform may generate a set of image crops for one or more areas around a given line. In the example shown, the characters E-1001 may be located near a given line. In this example, the document management platform may generate two image crops for two overlapping areas around the given line. Additionally, the document management platform may identify spatial coordinates of text near the given line using one or more techniques described above (e.g., increase resolution of the two image crops, binarize the two image crops, perform the set of filtering techniques, perform the text recognition technique, etc.). While the example shows identifying spatial coordinates for text located near a single line, the document management platform may repeat these operations for each line, of the set of lines, to identify all (or some) spatial coordinates of text that is located near the set of lines.

In some implementations (not shown), the document management platform may perform a text recognition technique and/or a filtering technique on the entire blueprint document. For example, the document management platform may perform a text recognition technique on the entire blueprint document to identify miscellaneous text that is part of the background information, to identify miscellaneous text that does not satisfy any configured criteria (e.g., text that is not within a shape, near a shape, near a line, etc.), to identify and/or remove unneeded characters (e.g., duplicate characters, commas, periods, and/or the like), and/or the like.

In some implementations, the document management platform may store the spatial coordinates for the text that is identified as being located near one or more lines. For example, the document management platform may store the spatial coordinates of the text in a manner that associates the spatial coordinates with the text and/or text identifiers for the text with line identifiers of lines that the text is near, and/or the like. Additionally, the document management platform may store spatial coordinates of the miscellaneous text with the miscellaneous text and/or identifiers for the miscellaneous text.

In this way, the document management platform identifies text near one or more lines within the blueprint document.

Figure 1M:
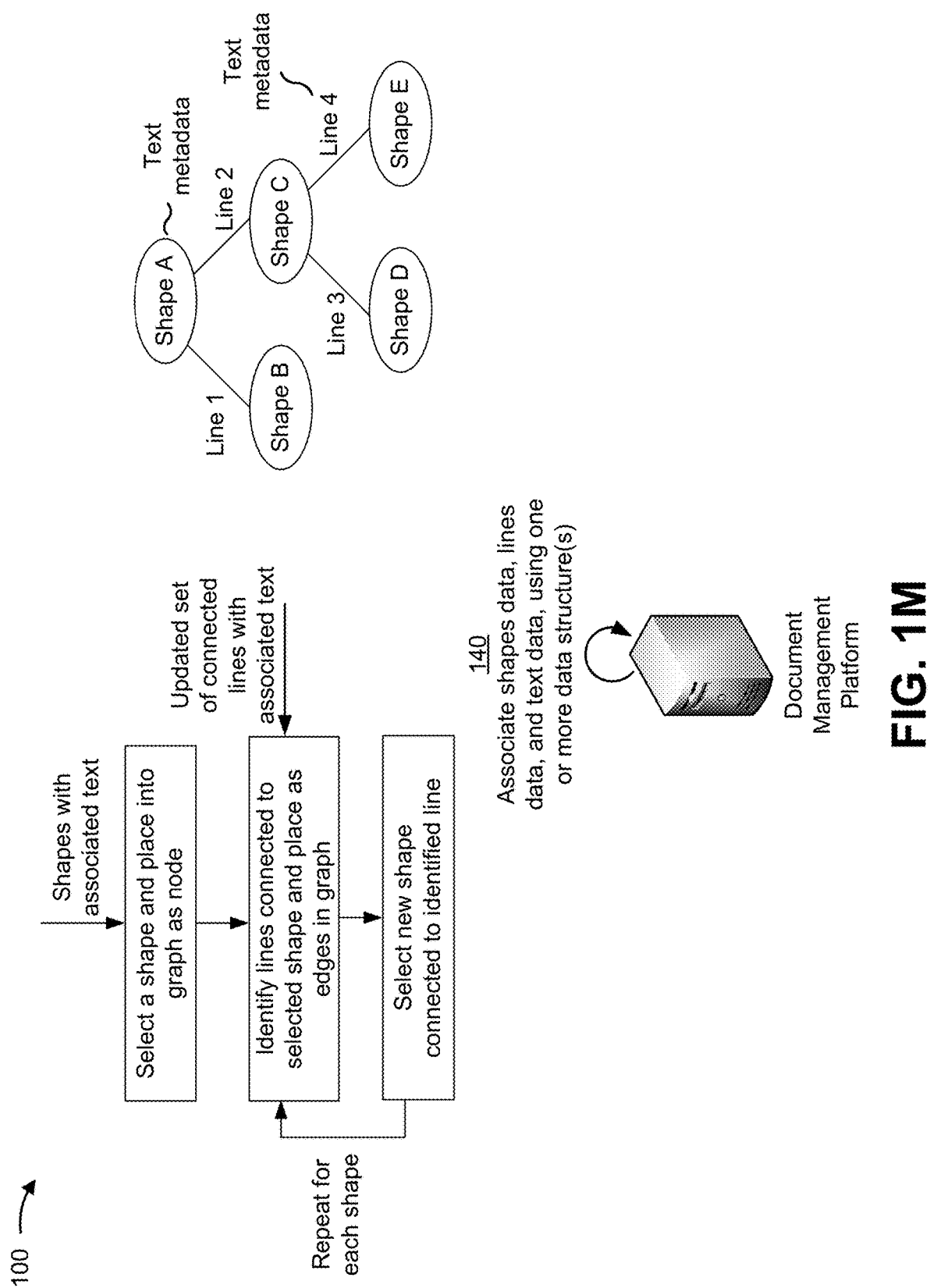

As shown in FIG. 1M, and by reference number 140, the document management platform may associate shape data that identifies the set of shapes, line data that identifies the set of connected lines, and text data that identifies the text, using one or more data structures. For example, the document management platform may generate one or more data structures to associate the shape data, the line data, and the text data, based on the first group of spatial coordinates, the second group of spatial coordinates, and the third group of spatial coordinates. The one or more data structures may include a graph data structure, an array, a linked-list, a relational database, a hash table, and/or the like. One or more examples below will illustrate associations created via a graph data structure.

In some implementations, the document management platform may generate a graph data structure that includes a set of nodes and a set of edges. The set of nodes may represent the set of shapes and corresponding text and the set of edges may represent the set of lines and corresponding text. The set of nodes may have node metadata that includes data that identifies the first group of spatial coordinates for the set of shapes, spatial coordinates for particular text associated with one or more shapes (e.g., within a shape, near a shape, etc.), identifiers for the set of shapes, identifiers for the particular text (and/or the actual text), a confidence score that indicates a confidence in accurately identifying spatial coordinates for a shape or text, and/or the like. The set of edges may have edge metadata that includes data that identifies the second group of spatial coordinates for the set of lines, spatial coordinates for particular text associated with the set of lines (e.g., near a line), identifiers for the set of lines, identifiers for the particular text (and/or the actual text), and/or the like.

In some implementations, to generate a graph data structure, the document management platform may begin by adding shape identifiers for the set of shapes to a first queue. In this case, the document management platform may, for a first shape identifier (e.g., which represents a first shape) in the first queue, generate a first node in the graph data structure and may generate corresponding node metadata that includes information described above (e.g., data that identifies spatial coordinates of the first shape, data that identifies spatial coordinates of text associated with the first shape, and/or the like). When the first node is generated, the document management platform may move the first shape identifier for the first shape to a second queue.

Additionally, the document management platform may, for the first shape identifier in the second queue, reference the second set of spatial coordinates to identify spatial coordinates of one or more lines that are connected to the first shape. This may allow the document management platform to generate one or more edges that connect to the first node and to generate corresponding edge metadata that includes information described above (e.g., data that identifies spatial coordinates for the one or more lines, data that identifies spatial coordinates of text associated with the one or more lines, and/or the like). The document management platform may iteratively repeat this process until the graph data structure includes nodes and edges for all (or some) shapes and lines within the blueprint document.

In some cases, the document management platform may generate one graph data structure for the blueprint document. In other cases, the document management platform may generate multiple graph data structures for the blueprint document. For example, the blueprint document may include multiple clusters of connected shapes and/or lines and may, using the technique described above, generate a graph data structure for each cluster of connected shapes and/or lines.

In some implementations, the document management platform may generate one or more additional data structures that associate additional types of information within the blueprint document. For example, the document management platform may generate a data structure that associates a document identifier for the blueprint document with the background information of the blueprint document. In this case, the document management platform may have previously identified spatial coordinates that indicate a position of the background information (e.g., which may have been part of a legend) within the blueprint document and may generate a data structure that associates the document identifier with the spatial coordinates, with the background information (e.g., and/or background information identifiers), and/or the like.

Additionally, or alternatively, and provided as another example, the document management platform may generate a data structure that associates the document identifier for the blueprint document with organizational data of one or more client organizations. For example, the document management platform may obtain organizational data for the organization and may associate particular organizational data with the document identifier. This may allow the document management platform to use the organizational data to identify and/or automatically correct one or more errors found within the technical document, generate and implement a recommendation to standardize content found within the technical document, and/or the like, as described in detail further herein.

Additionally, or alternatively, and provided as another example, the document management platform may generate a data structure that associates the document identifier for the blueprint document with manufacturing data of one or more product manufacturers. For example, the document management platform may obtain manufacturing data for one or more manufacturers of assets and/or parts of assets depicted in the blueprint document. This may allow the document management platform to use the manufacturing data to identify and/or automatically correct one or more errors found within the technical document, generate and implement a recommendation to standardize content found within the technical document, and/or the like, as described in detail further herein.

In this way, the document management platform associates the shapes data, the lines data, and the text data, using the one or more data structures.

Figure 1N:
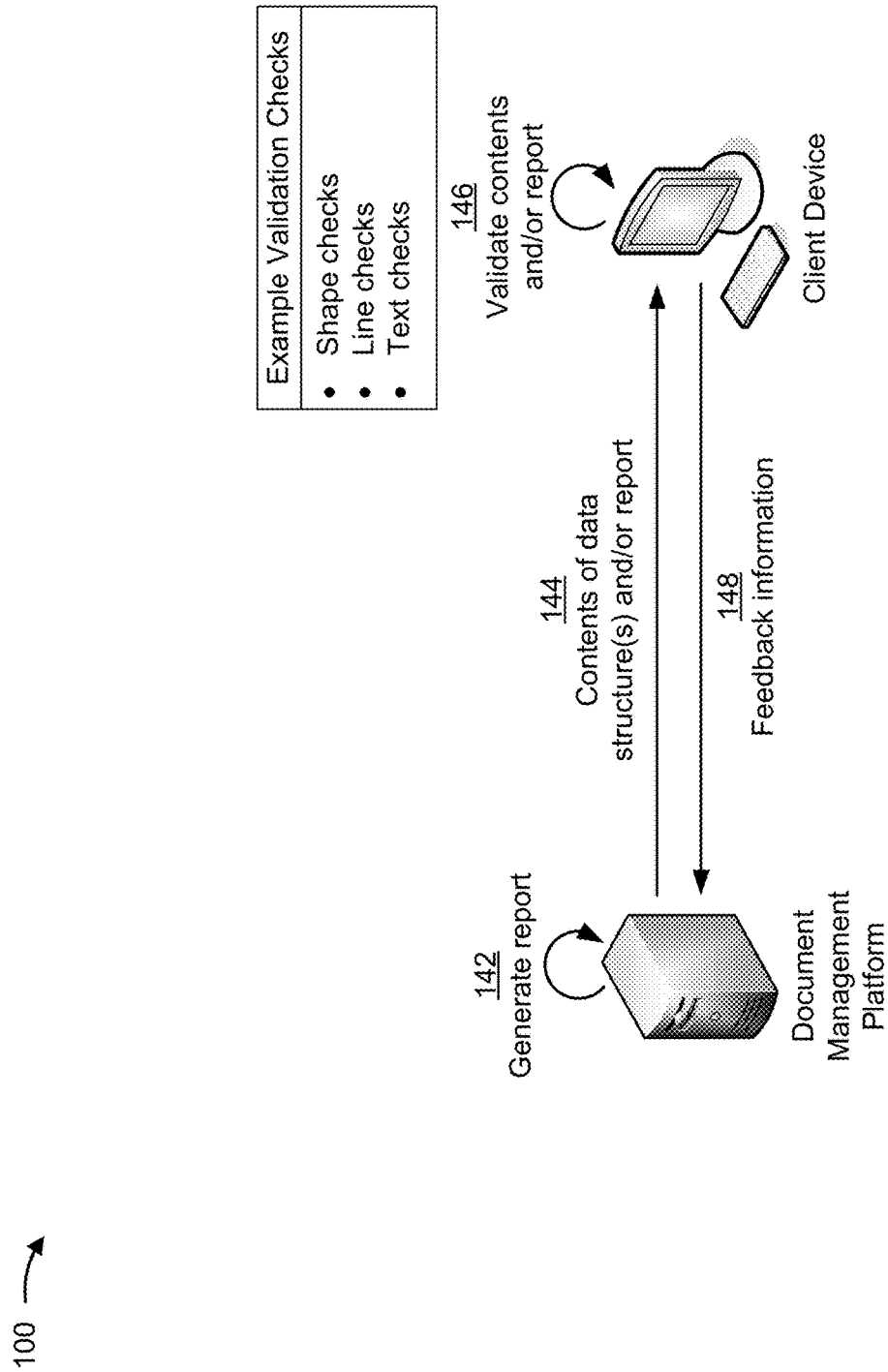
Figure 10:
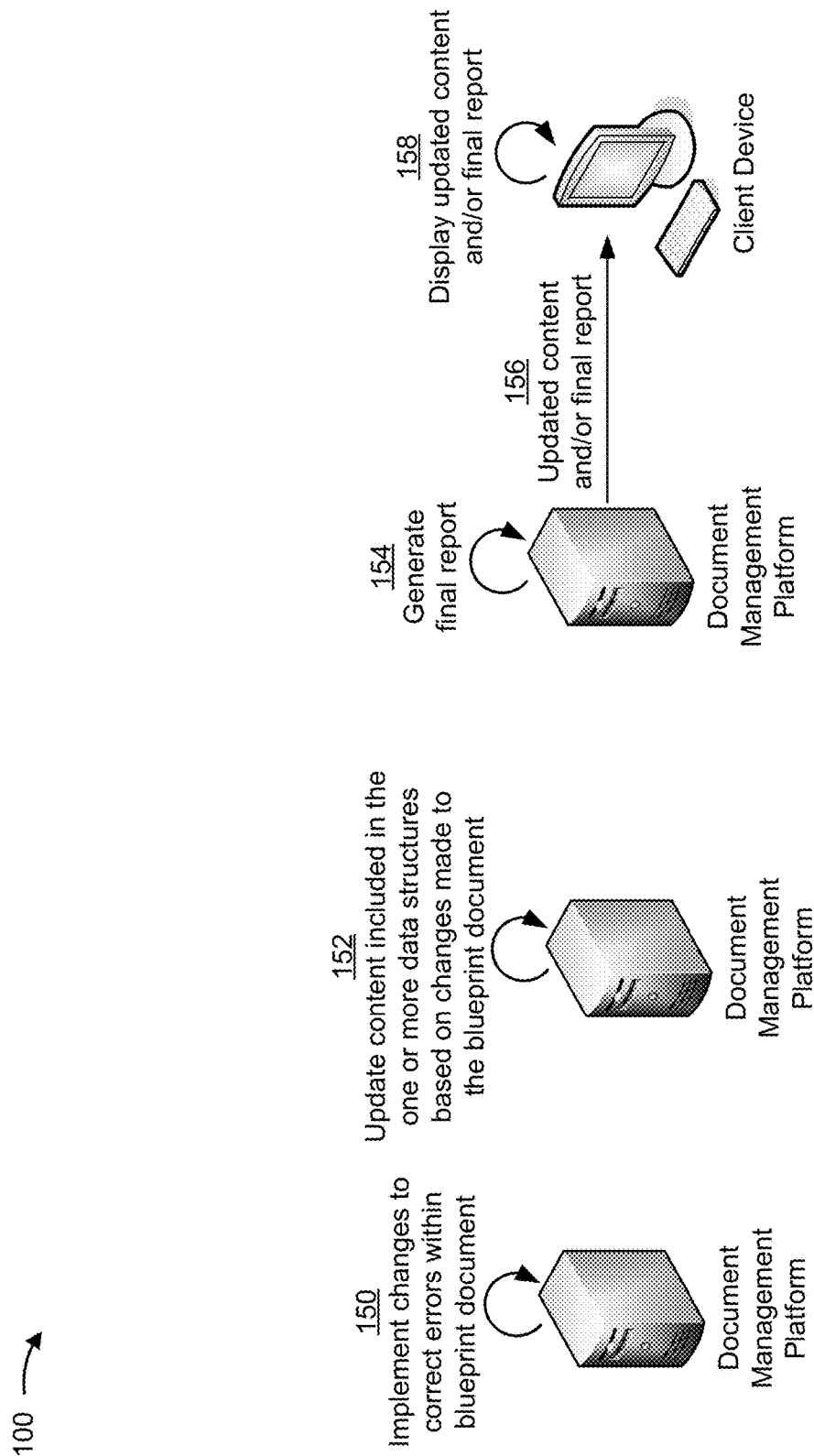

As shown in FIG. 1N, and as shown by reference number 142, the document management platform may generate a report. For example, the document management platform may process content included in the one or more data structures (e.g., the shapes data, the lines data, the text data, etc.) to generate a report that includes summary and statistics data (e.g., relating to performance of the set of models, errors identified during processing, etc.), recommendations data, and/or the like.

The summary and statistics data may include summary and statistics data for statistics associated with the blueprint document, summary and statistics data for statistics associated with a corpus of blueprint documents (e.g., if a corpus of blueprint documents have been processed in batch), summary and statistics data relative to similar blueprint documents, and/or the like. The summary and statistics data for statistics associated with the blueprint document may include performance metrics relating to processing the blueprint document (e.g., data indicating an amount of processing resources used by the set of data models, data indicating a time needed for the set of data models to process the blueprint document, etc.), error statistics that indicate a number of errors found within the blueprint document, and/or the like.

To provide a few specific examples, the summary and statistics data for statistics associated with the corpus of blueprint documents may include data describing interval-driven summaries (e.g., per week, per month, etc.) that indicate a number of blueprint documents processed over an interval, a number of blueprint documents that are presently being processed, a number of blueprint documents that were rejected during a validation phase (e.g., for having a low rate of accuracy), a number of blueprint documents that included a threshold number of errors, a change in a number of errors found within blueprint documents over time, one or more performance metrics associated with types of blueprint documents and/or authors of blueprint documents (e.g., errors identified in a particular type of blueprint document over time, errors identified in blueprint documents created by specific employees over time, etc.), and/or the like.

The recommendations data may include data that describes one or more recommended changes that may be made to the blueprint document, such as a recommended change that relates to standardizing an aspect of the blueprint document, a recommended change that involves adding, modifying, and/or deleting content included within the blueprint document, a recommended change to a procedure for creating the blueprint document, and/or the like.

Additionally, or alternatively, the document management platform may generate recommendation data to include in the report. For example, the document management platform may have determined a confidence value when identifying each error. If the confidence value satisfies a threshold confidence value, then the document management platform may automatically implement a particular recommendation, as described more further herein. If the confidence value fails to satisfy the threshold confidence value, then the document management platform may simply generate a recommendation to correct the error that has been identified (e.g., such that the user may make a determination as to whether to implement the recommended change). If the document management platform is unable to determine a confidence value for an error, the error may be displayed in the report with a recommendation to have a human user approve and/or reject the identified error.

As shown by reference number 144, the document management platform may provide contents of the one or more data structures (e.g., the shapes data, the lines data, the text data, etc.) and/or the report for display via an interface on the client device. For example, the document management platform may use a communication interface, such as an application programming interface (API) or another type of communication interface to provide the contents of the one or more data structures and/or the report for display via the interface.

As shown by reference number 146, the client device may validate the contents and/or the report. For example, a user may interact with a user interface to perform a validation of the contents of the one or more data structures and/or the report. To perform the validation, the user may perform a series of checks, as shown in the one or more examples below.

As an example, the user may determine whether one or more errors were made while identifying the set of shapes within the blueprint document. If errors were made, the user may, for example, determine whether the blueprint document includes one or more new shapes that were not used when training the first data model. If a new shape is present, the user may interact with the client device to add data that identifies the new shape to the shapes training data (e.g., which may be used to retrain the first data model).

As another example, the user may determine whether a shape was incorrectly identified by the document management platform. If a shape is found that was incorrectly identified, the user may create feedback information that indicates the incorrectly identified shape (e.g., such that the document management platform may use the feedback information to correctly label the shape) and/or may interact with the interface to correct the error (e.g., by modifying a value in a data structure such that the correct association is being made for the shape). As another example, the user may determine whether a shape is present that does not belong within the blueprint document. If a shape is found that does not belong within the blueprint document, the user may create feedback information and/or may interact with the interface to correct the error (e.g., such as by removing the shape or causing the shape to be removed from the blueprint document).

Additionally, the user may determine whether one or more errors were made while identifying the set of lines within the blueprint document. For example, the user may determine whether one or more lines, of the set of lines, are redundant lines. If a redundant line is found, the user may create feedback information and/or may interact with the interface to correct the error (e.g., such as by removing or causing the redundant line to be removed from the blueprint document). As another example, the user may determine whether one or more lines are missing from the blueprint document. If a line is missing, the user may create feedback information and/or may interact with the interface to correct the error (e.g., such as by adding the line that is missing to the blueprint document or causing the line to be added to the blueprint document).

Additionally, the user may determine whether one or more errors were made while identifying the text within the blueprint document. For example, the user may determine whether text associated with a shape is the correct text. If text associated with a shape is not the correct text, the user may create feedback information and/or may interact with the interface to correct the error (e.g., such as by causing the shape to be associated with the correct text). As another example, the user may determine whether text associated with a line is the correct text, in a manner similar to that described above.

As shown by reference number 148, the client device may provide feedback information to the document management platform. For example, if the document management platform is to correct errors identified by the user, the client device may provide the document management platform with feedback information that was created while performing the validation. In other cases, the client device may have been used to correct the errors identified by the user. In these cases, as the client device makes a correction, the document management platform may have been provided with instructions to implement the correction (e.g., by updating a value in a data structure, by adding a new value to the data structure, etc.).

In some implementations, the document management platform may automatically perform one or more checks that were described as being part of the validation performed by the user. For example, the document management platform may attempt to validate a shape by comparing spatial coordinates of the shape to configured spatial coordinates of a corresponding shape. If the spatial coordinates satisfy a threshold level of similarity with the configured spatial coordinates, the validation may succeed. If the spatial coordinates do not satisfy the threshold level of similarity with the configured spatial coordinates, the document management platform may determine that an error has been made while identifying the shape.

Additionally, the document management platform may use a set of error identification rules to identify one or more user errors that had been made while creating the blueprint document. The set of error detection rules may be specific to a particular type of blueprint document, specific to a particular client, specific to a particular industry standard, and/or the like. As an example, if a particular organization configures the document management platform with an error detection rule that indicates that a safety regulation prevents a particular type of valve from being used in a particular structural design. In this example, the document management platform may use the error detection rule to identify that the blueprint document includes a valve that is not compliant with the safety regulation. This may allow the document management platform to perform one or more actions to correct the error, to notify a user, and/or the like, as described further herein.

In this way, the document management platform performs one or more actions that cause errors within the blueprint document to be corrected and/or that cause feedback information to be received that may be used to improve accuracy of the set of data models.

As shown in FIG. 1O, and by reference number 150, the document management platform may implement a set of changes to correct errors within the blueprint document. For example, the document management platform may have identified a first set of changes that may be made to the blueprint document and may have received, from the client device, a second set of changes that may be made to the blueprint document. In this case, the document management platform may determine whether to implement the first set of changes and/or the second set of changes based on a set of rules. The set of rules may include a rule to automatically implement a change received from a user device (e.g., from a particular user who is authorized to make a change), a rule to determine whether to implement a change based on whether a confidence value relating to an identified error satisfies a threshold confidence value, and/or the like.

In some implementations, to implement a change, the document management platform may launch a blueprint design tool (e.g., via a graphical user interface (GUI), a web interface, and/or another type of interface or environment) and may modify the blueprint document to implement the change. As a specific example, the document management platform may identify that a shape of a triangle is supposed to be a shape of a square and may implement the change by replacing a class that corresponds to the shape of the triangle with a class that corresponds to the shape of the square.

As shown by reference number 152, the document management platform may update content included in the one or more data structures based on one or more changes made to the blueprint document. For example, the document management platform may have implemented a first set of changes to the blueprint document and/or the client device may have implemented a second set of changes to the blueprint document. In this case, the document management platform may update the content to reflect the first set of changes and/or the second set of changes.

As an example, if a change is implemented to change a class corresponding to a shape of a triangle within the blueprint document to a class corresponding to a shape of a square, the document management platform may perform one or more actions to ensure that the shapes data (and any other relevant data) accurately reflects the change. In this example, the document management platform may use the first data model and one or more techniques described herein to identify a new set of spatial coordinates for the shape of the square. Additionally, the document management platform may update values in a data structure to replace a set of spatial coordinates for the triangle with the new set of spatial coordinates for the square.

As shown by reference number 154, the document management platform may generate a final report. For example, the document management platform may use the updated content to generate a final report, in a manner described elsewhere herein.

As shown by reference number 156, the document management platform may provide the updated content and/or the final report for display via the interface that is accessible to the client device. As shown by reference number 158, the document management platform may provide the updated content and/or the final report for display via the interface. This may allow the user to view and/or approve the updated content and/or the final report, to make corrections to the final report and/or to the blueprint document, to update a library with content for the blueprint document (e.g., a shapes library, a text library, and/or the like), and/or the like.

In this way, the document management platform efficiently and effectively identifies and establishes associations between different content within the technical document and/or between content across multiple technical documents, thereby enabling one or more actions to be performed that improve accuracy of the blueprint document, improve standardization across blueprint documents, and conserve resources of devices described herein (e.g., processing resources, network resources, memory resources, and/or the like).

As indicated above, FIGS. 1A-1O are provided merely as one or more examples. Other examples may differ from what is described with regard to FIGS. 1A-1O. For example, there may be additional devices and/or networks, fewer devices and/or networks, different devices and/or networks, or differently arranged devices and/or networks than those shown in FIGS. 1A-1O. Furthermore, two or more devices shown in FIGS. 1A-1O may be implemented within a single device, or a single device shown in FIGS. 1A-1O may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
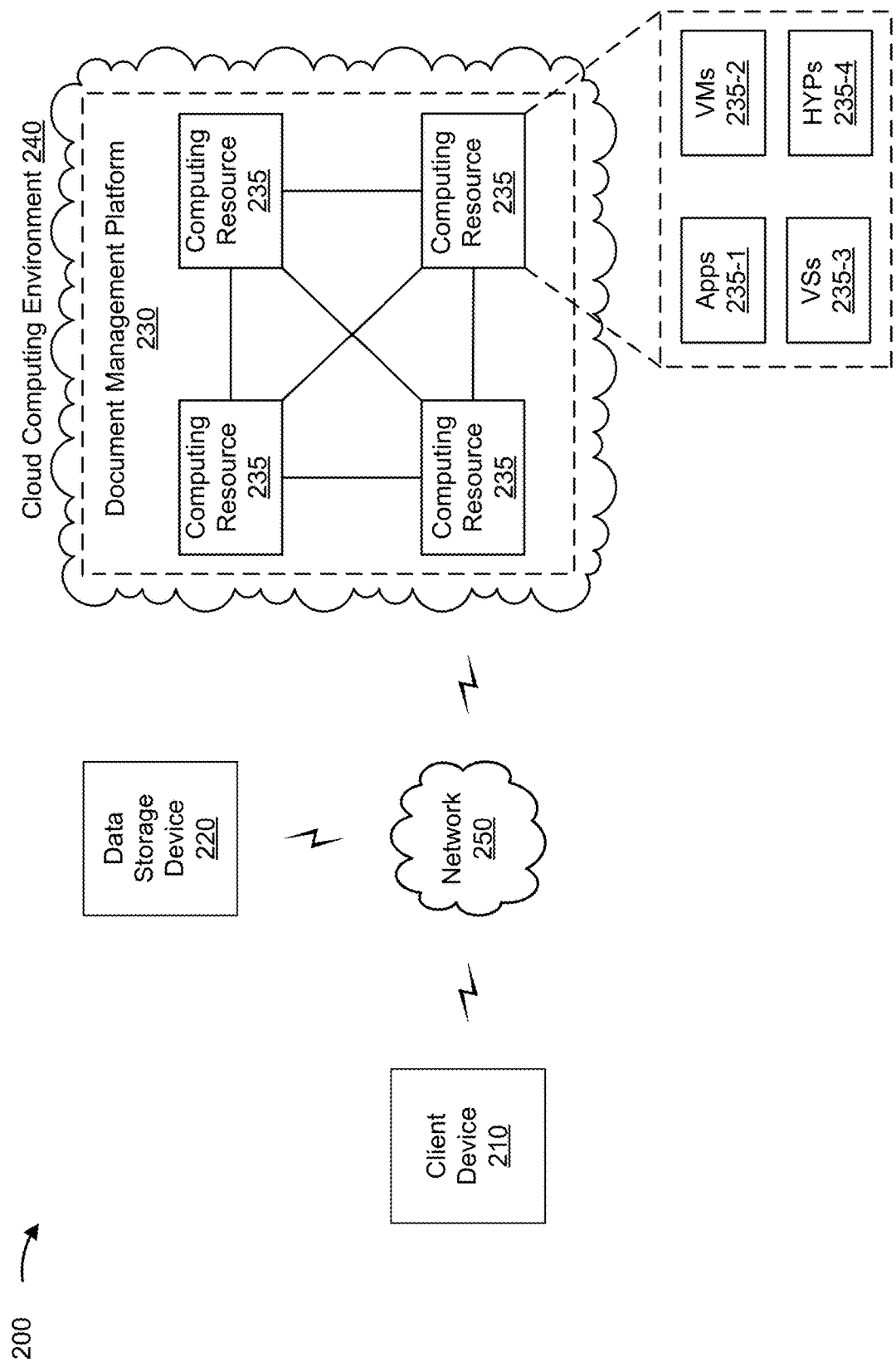
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a data storage device 220, a document management platform 230 hosted within a cloud computing environment 240, and/or a network 250. Devices of environment 200 may interconnect via wired connections, wireless connections, or a combination of wired and wireless connections.

Client device 210 includes one or more devices capable of receiving, generating, storing, processing, and/or providing information associated with one or more technical documents. For example, client device 210 may include a device or machine, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device or machine. In some implementations, client device 210 may receive contents of one or more data structures and/or a report from document management platform 230. In some implementations, client device 210 may provide feedback information to document management platform 230.

Data storage device 220 includes one or more devices capable of receiving, storing, generating, determining, and/or providing information associated with one or more data models. For example, data storage device 220 may include a server device or a group of server devices. In some implementations, data storage device 220 may provide data that may be used to train one or more data models to document management platform 230. In some implementations, data storage device 220 may store a blueprint document, may store data relating to a blueprint document, may store spatial coordinates associated with a blueprint document, and/or the like.

Document management platform 230 includes one or more devices capable of receiving, storing, generating, determining, and/or providing information associated with technical documentation. For example, document management platform 230 may include a server device (e.g., a host server, a web server, an application server, etc.), a data center device, or a similar device. In some implementations, document management platform 230 may train one or more data models in a manner described elsewhere herein and/or may receive one or more trained data models. In some implementations, document management platform 230 may support an application or website that client device 210 may interact with to perform one or more features or functions described herein.

In some implementations, as shown, document management platform 230 may be hosted in cloud computing environment 240. While implementations described herein describe document management platform 230 as being hosted in cloud computing environment 240, in some implementations, document management platform 230 might not be cloud-based (i.e., may be implemented outside of a cloud computing environment) or may be partially cloud-based.

Cloud computing environment 240 includes an environment that hosts document management platform 230. Cloud computing environment 240 may provide computation, software, data access, storage, etc. services that do not require end-user knowledge of a physical location and configuration of system(s) and/or device(s) that hosts document management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host document management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by client device 210 and/or data storage device 220. Application 235-1 may eliminate a need to install and execute the software applications on these devices. For example, application 235-1 may include software associated with document management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., client device 210, data storage device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
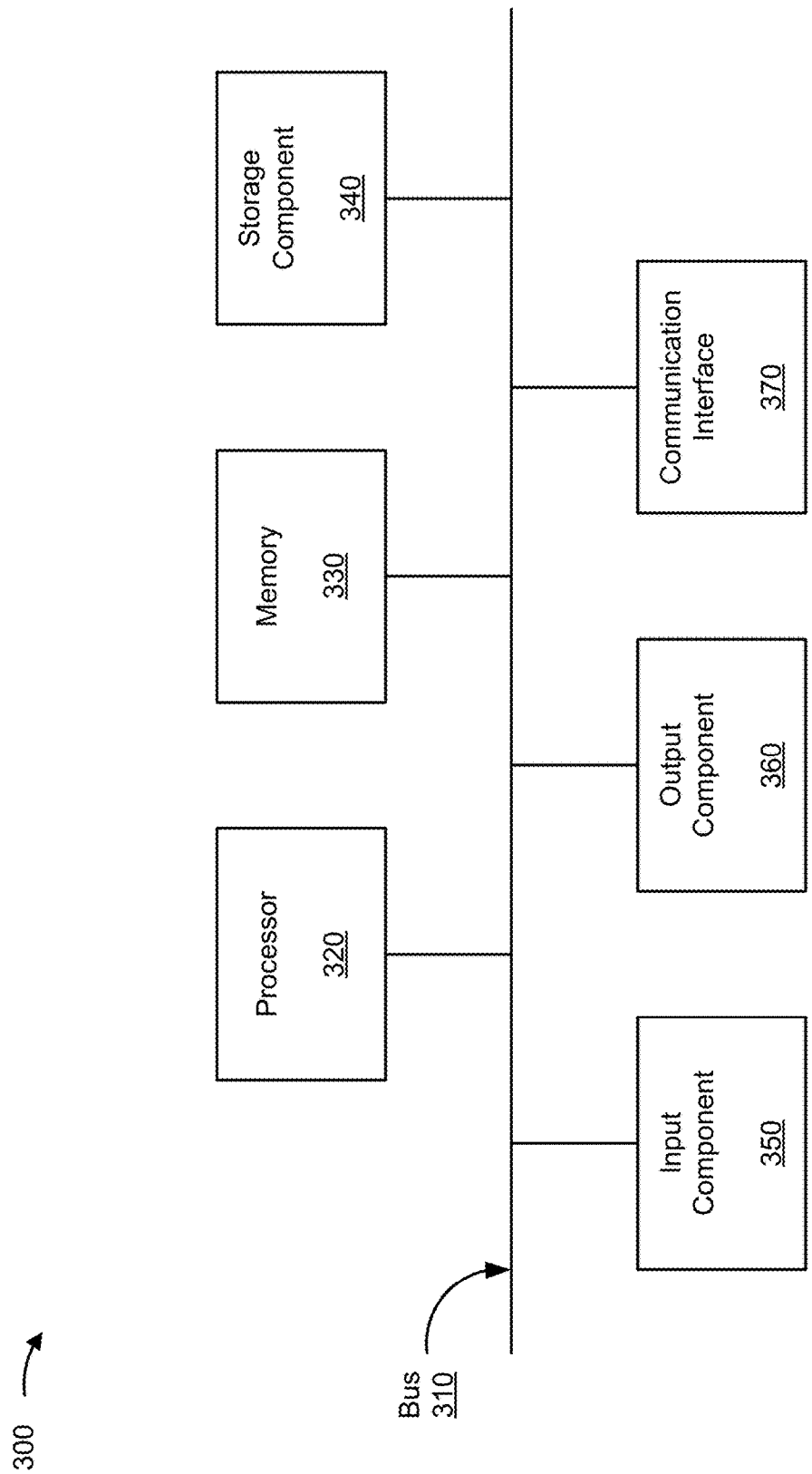
FIG. 3 is a diagram of example components of one or more devices of FIG. 2.

FIG. 3 is a diagram of example components of a device 300. Device 300 may correspond to client device 210, data storage device 220, and/or document management platform 230. In some implementations, client device 210, data storage device 220, and/or document management platform 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
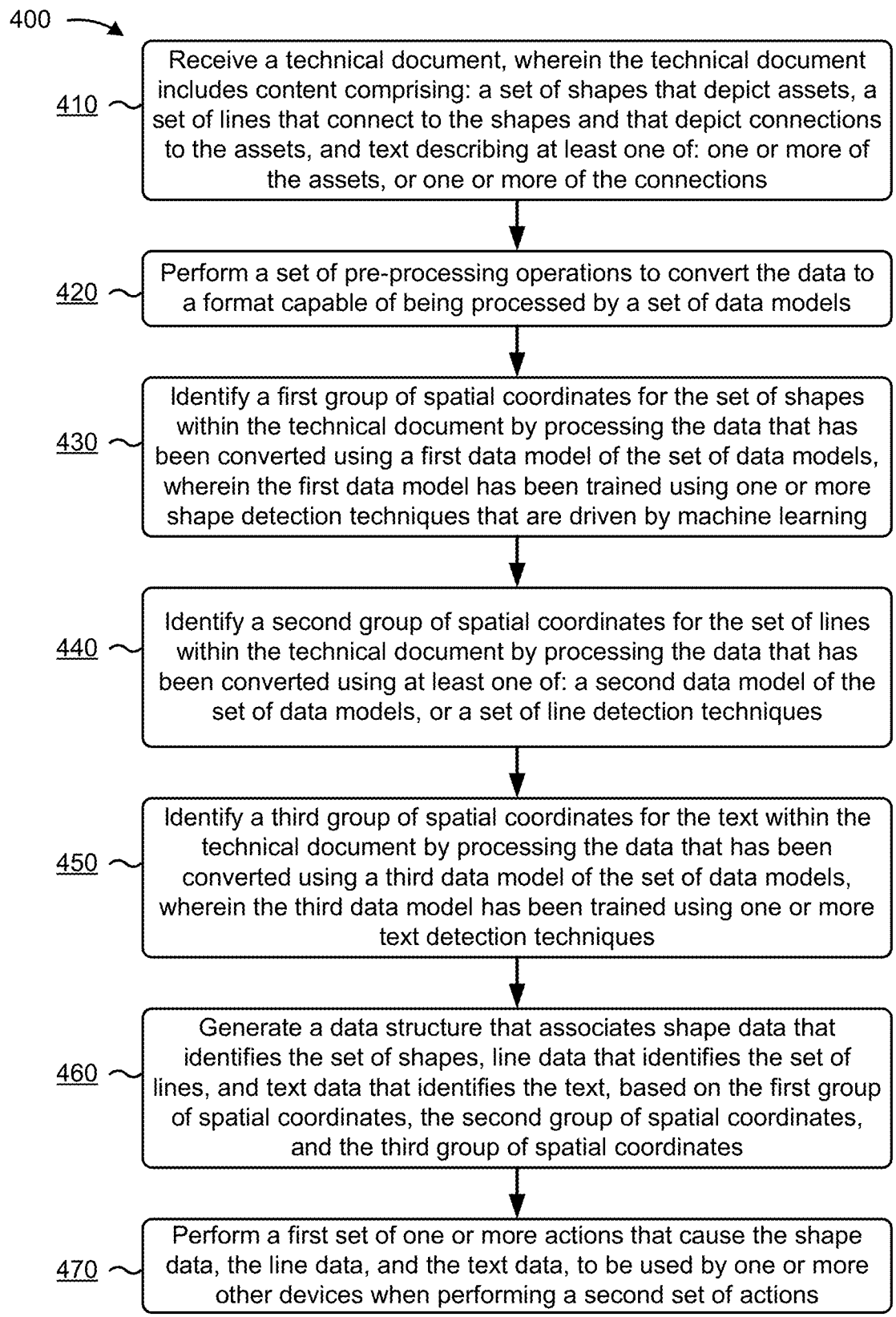
FIGS. 4-6 are flowcharts of example processes for using machine learning to detect a set of shapes, a set of lines, and a set of text within a technical document.

FIG. 4 is a flow chart of an example process 400 for using machine learning to detect a set of shapes, a set of lines, and a set of text within a technical document. In some implementations, one or more process blocks of FIG. 4 may be performed by a document management platform (e.g., document management platform 230). In some implementations, one or more process blocks of FIG. 4 may be performed by another device or a group of devices separate from or including the document management platform, such as a client device (e.g., client device 210), a data storage device (e.g., data storage device 220), and/or the like.

As shown in FIG. 4, process 400 may include receiving a technical document, wherein the technical document includes content comprising: a set of shapes that depict assets, a set of lines that connect to the assets and that depict connections to the assets, and text describing at least one of: one or more of the assets, or one or more of the connections (block 410). For example, the document management platform (e.g., using computing resource 235, processor 320, memory 330, storage component 340, input component 350, communication interface 370, and/or the like) may receive a technical document, as described above. In some implementations, the technical document may include content comprising: a set of shapes that depict assets, a set of lines that connect to the assets and that depict connections to the assets, and text describing at least one of: one or more of the assets, or one or more of the connections.

As further shown in FIG. 4, process 400 may include performing a set of pre-processing operations to convert the data to a format capable of being processed by a set of data models (block 420). For example, the document management platform (e.g., using computing resource 235, processor 320, memory 330, storage component 340, and/or the like) may perform a set of pre-processing operations to convert the data to a format capable of being processed by a set of data models, as described above.

As further shown in FIG. 4, process 400 may include identifying a first group of spatial coordinates for the set of shapes within the technical document by processing the data that has been converted using a first data model of the set of data models, wherein the first data model has been trained using one or more shape detection techniques that are driven by machine learning (block 430). For example, the document management platform (e.g., using computing resource 235, processor 320, memory 330, storage component 340, and/or the like) may identify a first group of spatial coordinates for the set of shapes within the technical document by processing the data that has been converted using a first data model of the set of data models, as described above. In some implementations, the first data model has been trained using one or more shape detection techniques that are driven by machine learning.

As further shown in FIG. 4, process 400 may include identifying a second group of spatial coordinates for the set of lines within the technical document by processing the data that has been converted using at least one of: a second data model of the set of data models, or a set of line detection techniques (block 440). For example, the document management platform (e.g., using computing resource 235, processor 320, memory 330, storage component 340, and/or the like) may identify a second group of spatial coordinates for the set of lines within the technical document by processing the data that has been converted using at least one of: a second data model of the set of data models, or a set of line detection techniques, as described above.

As further shown in FIG. 4, process 400 may include identifying a third group of spatial coordinates for the text within the technical document by processing the data that has been converted using a third data model of the set of data models, wherein the third data model has been trained using one or more text detection techniques (block 450). For example, the document management platform (e.g., using computing resource 235, processor 320, memory 330, storage component 340, and/or the like) may identify a third group of spatial coordinates for the text within the technical document by processing the data that has been converted using a third data model of the set of data models, as described above. In some implementations, the third data model has been trained using one or more text detection techniques.

As further shown in FIG. 4, process 400 may include generating a data structure that associates shape data that identifies the set of shapes, line data that identifies the set of lines, and text data that identifies the text, based on the first group of spatial coordinates, the second group of spatial coordinates, and the third group of spatial coordinates (block 460). For example, the document management platform (e.g., using computing resource 235, processor 320, memory 330, storage component 340, and/or the like) may generate a data structure that associates shape data that identifies the set of shapes, line data that identifies the set of lines, and text data that identifies the text, based on the first group of spatial coordinates, the second group of spatial coordinates, and the third group of spatial coordinates, as described above.

As further shown in FIG. 4, process 400 may include performing a first set of one or more actions that cause the shape data, the line data, and the text data, to be used by one or more other devices when performing a second set of actions (block 470). For example, the document management platform (e.g., using computing resource 235, processor 320, memory 330, storage component 340, input component 350, output component 360, communication interface 370, and/or the like) may perform a first set of one or more actions that cause the shape data, the line data, and the text data, to be used by one or more other devices when performing a second set of actions, as described above.

Process 400 may include additional implementations, such as any single implementation or any combination of implementations described below and/or in connection with one or more other processes described elsewhere herein.

In some implementations, when identifying the second group of spatial coordinates, the document management platform may identify clusters of values that represent non-white pixels of particular lines. In some implementations, the non-white pixels may share a particular spatial coordinate. Additionally, the document management platform may determine lengths of the clusters of values. Additionally, the document management platform may determine whether the lengths of the clusters of values satisfies a threshold length. Additionally, the document management platform may filter one or more of the clusters of values based whether the lengths of the clusters of values satisfies the threshold length. Additionally, the document management platform may use the clusters of values that have been filtered to identify an initial group of spatial coordinates for horizontal lines and vertical lines included within the technical document. Additionally, the document management platform may use the initial group of spatial coordinates to identify the second group of spatial coordinates that indicate locations for the set of lines within the technical document.

In some implementations, when identifying the second group of spatial coordinates, the document management platform may identify an initial group of spatial coordinates that indicate particular locations for one or more groups of consecutive non-white pixels, may identify particular spatial coordinates for one or more dotted lines within the technical document, and may filter the initial group of spatial coordinates that indicate the particular locations for the one or more groups of consecutive non-white pixels to exclude particular spatial coordinates for the one or more dotted lines.

In some implementations, when identifying the second group of spatial coordinates, the document management platform may identify a particular group of spatial coordinates for one or more lines, of the set of lines, that have a line thickness of two or more pixels, may update the particular group of spatial coordinates in a manner that causes the particular group of spatial coordinates to represent a reduced line thickness of one pixel, and may use the particular group of spatial coordinates that has been updated to identify the second group of spatial coordinates that indicate locations for the set of lines within the technical document.

In some implementations, when identifying the second group of spatial coordinates, the document management platform may identify an initial group of spatial coordinates for lines that are part of the set of lines included within the technical document, may filter the initial group of spatial coordinates for the lines to include spatial coordinates for endpoints of the lines and to exclude particular spatial coordinates for intermediary points within the lines, and may use the initial group of spatial coordinates that have been filtered to identify the second group of spatial coordinates that indicate locations for the set of lines within the technical document.

In some implementations, when identifying the second group of spatial coordinates, the document management platform may identify an initial group of spatial coordinates for two lines that are included within the technical document, where the two lines share an X-coordinate or a Y-coordinate and are separated by a perpendicular line that is not connected to either of the two lines, and may determine, using a first line detection technique of the set of line detection techniques, that the two lines are part of a single line. Additionally, the document management platform may select a first set of endpoint coordinates for a point on a first line, of the two lines, that is furthest from the perpendicular line, may select a second set of endpoint coordinates for a point on a second line, of the two lines, that is furthest from the perpendicular line, and may use the first set of endpoint coordinates and the second set of endpoint coordinates, as the initial group of spatial coordinates for the two lines, when using one or more other line detection techniques, of the set of line detection techniques, to identify the second group of spatial coordinates.

In some implementations, when identifying the second group of spatial coordinates, the document management platform may identify spatial coordinates for a portion of the technical document that includes background information, and may exclude the spatial coordinates for the portion of the technical document that includes the background information from the second group of spatial coordinates that indicate locations for the set of lines within the technical document. In some implementations, when identifying the second group of spatial coordinates, the document management platform may identify, as part of the second group of spatial coordinates, spatial coordinates for a set of connected lines, where the set of connected lines include at least one horizontal line and at least one vertical line.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
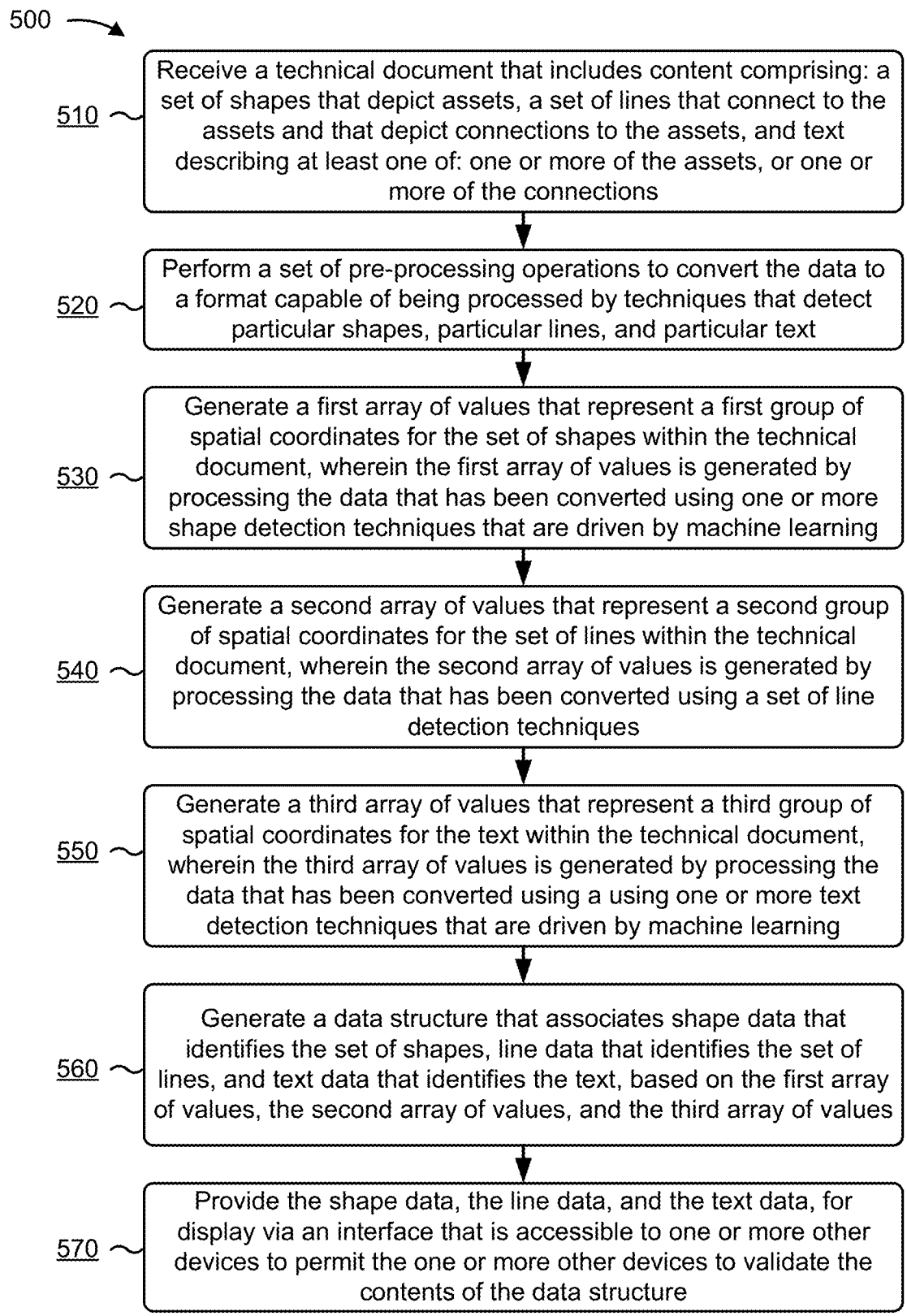

FIG. 5 is a flow chart of an example process 500 for using machine learning to detect a set of shapes, a set of lines, and a set of text within a technical document. In some implementations, one or more process blocks of FIG. 5 may be performed by a document management platform (e.g., document management platform 230). In some implementations, one or more process blocks of FIG. 5 may be performed by another device or a group of devices separate from or including the document management platform, such as a client device (e.g., client device 210), a data storage device (e.g., data storage device 220), and/or the like.

As shown in FIG. 5, process 500 may include receiving a technical document that includes content comprising: a set of shapes that depict assets, a set of lines that connect to the set of shapes and that depict the assets, and text describing at least one of: one or more of the assets, or one or more of the connections (block 510). For example, the document management platform (e.g., using computing resource 235, processor 320, memory 330, storage component 340, input component 350, communication interface 370, and/or the like) may receive a technical document that includes content comprising: a set of shapes that depict assets, a set of lines that connect to the set of shapes and that depict the assets, and text describing at least one of: one or more of the assets, or one or more of the connections, as described above.

As shown in FIG. 5, process 500 may include performing a set of pre-processing operations to convert the data to a format capable of being processed by techniques that detect particular shapes, particular lines, and particular text (block 520). For example, the document management platform (e.g., using computing resource 235, processor 320, memory 330, storage component 340, and/or the like) may perform a set of pre-processing operations to convert the data to a format capable of being processed by techniques that detect particular shapes, particular lines, and particular text, as described above.

As shown in FIG. 5, process 500 may include generating a first array of values that represent a first group of spatial coordinates for the set of shapes within the technical document, wherein the first array of values is generated by processing the data that has been converted using one or more shape detection techniques that are driven by machine learning (block 530). For example, the document management platform (e.g., using computing resource 235, processor 320, memory 330, storage component 340, and/or the like) may generate a first array of values that represent a first group of spatial coordinates for the set of shapes within the technical document, as described above. In some implementations, the first array of values may be generated by processing the data that has been converted using one or more shape detection techniques that are driven by machine learning.

As shown in FIG. 5, process 500 may include generating a second array of values that represent a second group of spatial coordinates for the set of lines within the technical document, wherein the second array of values is generated by processing the data that has been converted using a set of line detection techniques (block 540). For example, the document management platform (e.g., using computing resource 235, processor 320, memory 330, storage component 340, and/or the like) may generate a second array of values that represent a second group of spatial coordinates for the set of lines within the technical document, as described above. In some implementations, the second array of values is generated by processing the data that has been converted using a set of line detection techniques.

As shown in FIG. 5, process 500 may include generating a third array of values that represent a third group of spatial coordinates for the text within the technical document, wherein the third array of values is generated by processing the data that has been converted using one or more text detection techniques that are driven by machine learning (block 550). For example, the document management platform (e.g., using computing resource 235, processor 320, memory 330, storage component 340, and/or the like) may generate a third array of values that represent a third group of spatial coordinates for the text within the technical document, as described above. In some implementations, the third array of values is generated by processing the data that has been converted using one or more text detection techniques that are driven by machine learning.

As shown in FIG. 5, process 500 may include generating a data structure that associates shape data that identifies the set of shapes, line data that identifies the set of lines, and d on the first array of values, the second array of values, and the third array of values (block 560). For example, the document management platform (e.g., using computing resource 235, processor 320, memory 330, storage component 340, and/or the like) may generate a data structure that associates shape data that identifies the set of shapes, line data that identifies the set of lines, and text data that identifies the text, based on the first array of values, the second array of values, and the third array of values, as described above.

As shown in FIG. 5, process 500 may include providing the shape data, the line data, and the text data, for display via an interface that is accessible to one or more other devices to permit the one or more other devices to validate the contents of the data structure (block 570). For example, the document management platform (e.g., using computing resource 235, processor 320, memory 330, storage component 340, output component 360, communication interface 370, and/or the like) may provide the shape data, the line data, and the text data, for display via an interface that is accessible to one or more other devices to permit the one or more other devices to validate the contents of the data structure, as described above.

Process 500 may include additional implementations, such as any single implementation or any combination of implementations described below and/or in connection with one or more other processes described elsewhere herein.

In some implementations, the document management platform may receive, before receiving the data that describes the contents of the technical document, shapes training data. Additionally, the document management platform may receive a set of files that include data that identifies sets of spatial coordinates for one or more templated sizes of technical documents. Additionally, the document management platform may identify sets of spatial coordinates for the images of the set of technical documents, may generate a set of binary masks for shapes within the set of technical documents, and may train a neural network to identify the shapes within the set of technical documents by using one or more machine learning techniques and the set of binary masks to analyze the shapes training data.

In some implementations, when identifying the second group of spatial coordinates, the document management platform may identify an initial group of spatial coordinates for an initial set of lines that are included within the technical document, and may identify two or more lines, of the initial set of lines, that are separated by one or more spaces and that collectively represent a single line. Additionally, the document management platform may determine that the single line connects to at least one of: one or more horizontal lines included within the technical document, or one or more vertical lines included within the technical document. Additionally, the document management platform may identify a group of spatial coordinates for the single line and at least one of the one or more horizontal lines or the one or more vertical lines, wherein the group of spatial coordinates are part of the second group of spatial coordinates.

In some implementations, when identifying the third group of spatial coordinates, the document management platform may identify, as part of the third group of spatial coordinates, a first subgroup of spatial coordinates for a first set of characters of text that is located within a threshold distance of one or more shapes, of the set of shapes within the technical document, and that is not located inside of the one or more shapes, may identify, as part of the third group of spatial coordinates, a second subgroup of spatial coordinates for a second set of characters of text that is located inside one or more other shapes, of the set of shapes within the technical document, and may identify, as part of the third group of spatial coordinates, a third subgroup of spatial coordinates for a third set of characters of text that is located within a threshold distance of one or more of the set of lines within the technical document.

In some implementations, when identifying the third group of spatial coordinates, the document management platform may determine whether particular text is to be placed inside of a shape of the set of shapes within the technical document, and may analyze an area inside of the shape or on one or more areas outside of the shape based on whether the text is to be placed inside of the shape, where the particular text detection module is to identify spatial coordinates for the particular text, and where the spatial coordinates are part of the third group of spatial coordinates.

In some implementations, when identifying the third group of spatial coordinates, the document management platform may scale an area of the technical document that includes particular text, may generate an array of values that represent a binarized version of the area that has been scaled, may filter the array of values to exclude a first set of values that represent particular lines located near sides of the area that has been scaled, may filter the array of values to exclude a second set of values that represent foreground pixels, and may analyze the array of values that has been filtered to identify spatial coordinates for the particular text, where the spatial coordinates are part of the third group of spatial coordinates.

In some implementations, when identifying the third group of spatial coordinates, the document management platform may perform a particular line detection technique, of the set of line detection techniques, on one or more areas around a line, of the set of lines, to identify spatial coordinates for particular text on one or more areas around a line, of the set of lines, to identify spatial coordinates for particular text, and may filter the particular text by referencing one or more configured rules that indicate types of text or properties of text that are commonly used around the line, where the spatial coordinates are part of the third group of spatial coordinates and indicate a location for the particular text that has been filtered.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
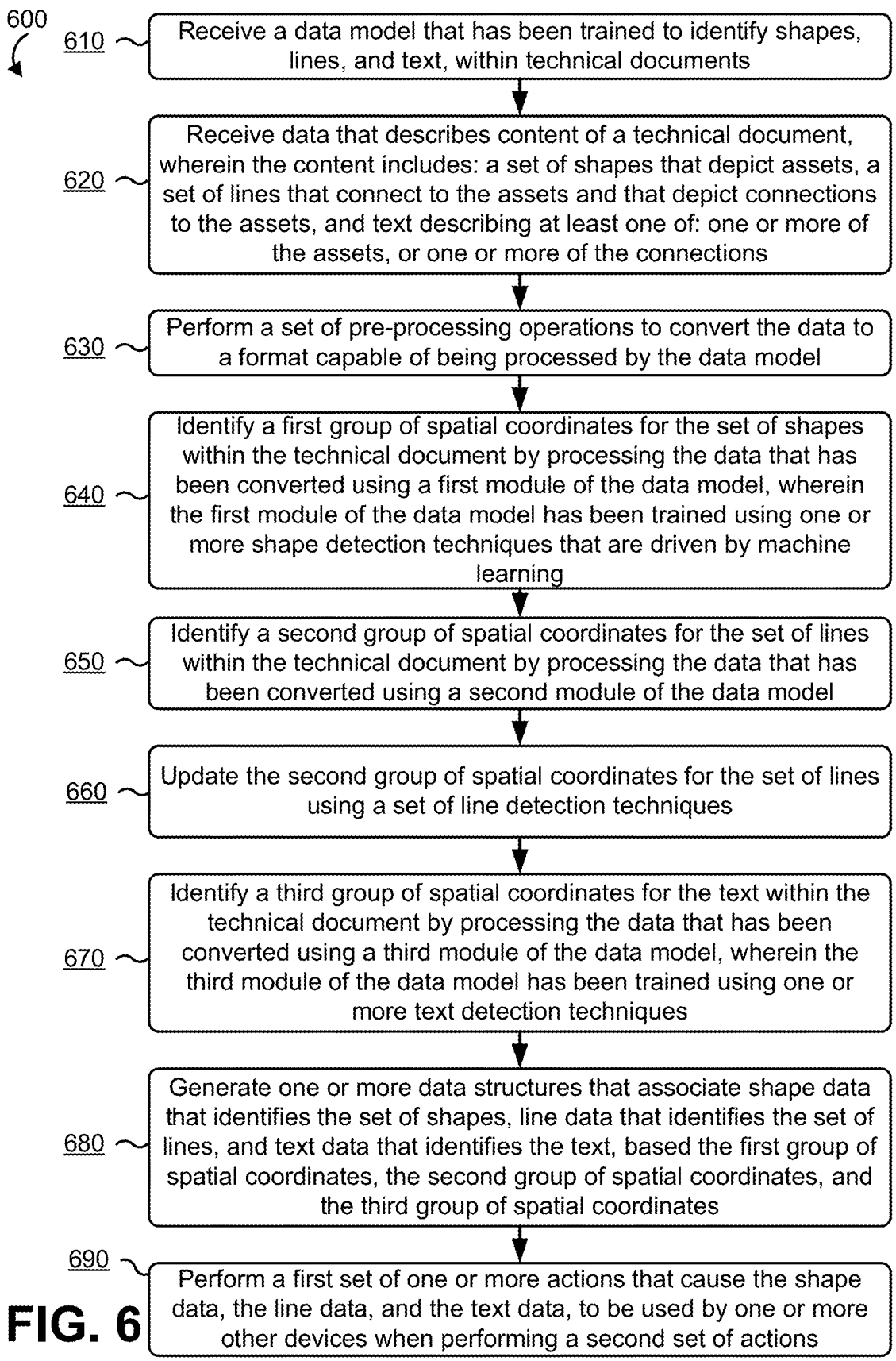

FIG. 6 is a flow chart of an example process 600 for using machine learning to detect a set of shapes, a set of lines, and a set of text within a technical document. In some implementations, one or more process blocks of FIG. 6 may be performed by a document management platform (e.g., document management platform 230). In some implementations, one or more process blocks of FIG. 6 may be performed by another device or a group of devices separate from or including the document management platform, such as a client device (e.g., client device 210), a data storage device (e.g., data storage device 220), and/or the like.

As shown in FIG. 6, process 600 may include receiving a data model that has been trained to identify shapes, lines, and text, within technical documents (block 610). For example, the document management platform (e.g., using computing resource 235, processor 320, memory 330, storage component 340, input component 350, communication interface 370, and/or the like) may receive a data model that has been trained to identify shapes, lines, and text, within technical documents, as described above.

As shown in FIG. 6, process 600 may include receiving data that describes content of a technical document, wherein the content includes: a set of shapes that depict assets, a set of lines that connect to the set of shapes and that depict the assets, and text describing at least one of: one or more of the assets, or one or more of the connections (block 620). For example, the document management platform (e.g., using computing resource 235, processor 320, memory 330, storage component 340, input component 350, communication interface 370, and/or the like) may receive data that describes content of a technical document, as described above. In some implementations, the content may include a set of shapes that depict assets, a set of lines that connect to the set of shapes and that depict the assets, and text describing at least one of: one or more of the assets, or one or more of the connections.

As shown in FIG. 6, process 600 may include performing a set of pre-processing operations to convert the data to a format capable of being processed by the data model (block 630). For example, the document management platform (e.g., using computing resource 235, processor 320, memory 330, storage component 340, and/or the like) may perform a set of pre-processing operations to convert the data to a format capable of being processed by the data model, as described above.

As shown in FIG. 6, process 600 may include identifying a first group of spatial coordinates for the set of shapes within the technical document by processing the data that has been converted using a first module of the data model, wherein the first module of the data model has been trained using one or more shape detection techniques that are driven by machine learning (block 640). For example, the document management platform (e.g., using computing resource 235, processor 320, memory 330, storage component 340, and/or the like) may identify a first group of spatial coordinates for the set of shapes within the technical document by processing the data that has been converted using a first module of the data model, as described above. In some implementations, the first module of the data model has been trained using one or more shape detection techniques that are driven by machine learning.

As shown in FIG. 6, process 600 may include identifying a second group of spatial coordinates for the set of lines within the technical document by processing the data that has been converted using a second module of the data model, wherein the second module of the data model has been trained using a set of line detection techniques (block 650). For example, the document management platform (e.g., using computing resource 235, processor 320, memory 330, storage component 340, and/or the like) may identify a second group of spatial coordinates for the set of lines within the technical document by processing the data that has been converted using a second module of the data model, as described above.

As shown in FIG. 6, process 600 may include updating the second group of spatial coordinates for the set of lines by processing the data that has been converted using a set of line detection techniques (block 660). For example, the document management platform (e.g., using computing resource 235, processor 320, memory 330, storage component 340, and/or the like) may update the second group of spatial coordinates for the set of lines by processing the data that has been converted using a set of line detection techniques, as described above.

As shown in FIG. 6, process 600 may include identifying a third group of spatial coordinates for the text within the technical document by processing the data that has been converted using a third module of the data model, wherein the third module of the data model has been trained using one or more text detection techniques (block 670). For example, the document management platform (e.g., using computing resource 235, processor 320, memory 330, storage component 340, and/or the like) may identify a third group of spatial coordinates for the text within the technical document by processing the data that has been converted using a third module of the data model, as described above. In some implementations, the third module of the data model may have been trained using one or more text detection techniques.

As shown in FIG. 6, process 600 may include generating one or more data structures that associate shape data that identifies the set of shapes, line data that identifies the set of lines, and text data that identifies the text, based on the first group of spatial coordinates, the second group of spatial coordinates, and the third group of spatial coordinates (block 680). For example, the document management platform (e.g., using computing resource 235, processor 320, memory 330, storage component 340, and/or the like) may generate one or more data structures that associate shape data that identifies the set of shapes, line data that identifies the set of lines, and text data that identifies the text, based on the first group of spatial coordinates, the second group of spatial coordinates, and the third group of spatial coordinates, as described above.

As shown in FIG. 6, process 600 may include performing a first set of one or more actions that cause the shape data, the line data, and the text data, to be used by one or more other devices when performing a second set of actions (block 690). For example, the document management platform (e.g., using computing resource 235, processor 320, memory 330, storage component 340, input component 350, output component 360, communication interface 370, and/or the like) may perform a first set of one or more actions that cause the shape data, the line data, and the text data, to be used by one or more other devices when performing a second set of actions, as described above.

Process 600 may include additional implementations, such as any single implementation or any combination of implementations described below and/or in connection with one or more other processes described elsewhere herein.

In some implementations, when identifying the first group of spatial coordinates, the document management platform may generate a set of image crops for sets of pixels of regions within the technical document, may generate, by using the first module of the data model to analyze the set of image crops, a set of values that indicate likelihoods of the sets of pixels being part of specific shapes, may determine that one or more subsets of values, of the set of values, satisfy a threshold confidence value, and may identify, as the first group of spatial coordinates, particular spatial coordinates that are associated with the one or more subsets of values that satisfy the threshold confidence value.

In some implementations, when generating the one or more data structures, the document management platform may generate a set of nodes and a set of edges for a data structure, of the one or more data structures, by analyzing the first group of spatial coordinates, the second group of spatial coordinates, and the third group of spatial coordinates, where the set of nodes represent the set of shapes, where node metadata for the set of nodes includes the first group of spatial coordinates and a first subset of the third group of spatial coordinates for particular text associated with the set of shapes, where the set of edges represent the set of lines, and where edge metadata for set of edges includes the second group of spatial coordinates and a second subset of the third group of spatial coordinates for particular text associated with the set of lines.

In some implementations, the document management platform may generate, after generating the one or more data structures, a report that indicates an amount of content included within the technical document that was able to be mapped to the contents of the one or more data structures, may provide the report to another device to cause the other device to provide feedback information to the device, and may update the contents of the one or more data structures based on the feedback information. In some implementations, the first set of one or more actions may include at least one of: a first action to provide the contents of the data structure or a report for display via an interface to cause the contents to be accessible to one or more other devices, a second action to identify an error within the technical document, a third action to automatically correct the error within the technical document, or a fourth action to provide, for display via the interface, a recommendation to standardize an aspect of the technical document.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, a technical document,
wherein the technical document includes content comprising:
a set of shapes that depict assets,
a set of lines that connect to the set of shapes and that depict connections to the assets, and
text describing at least one of:
one or more of the assets, or
one or more of the connections;
performing, by the device, a set of pre-processing operations to convert data that describes the content to a format that is processed by a set of data models;
identifying, by the device, a first group of spatial coordinates for the set of shapes within the technical document by processing the data that has been converted using a first data model of the set of data models,
wherein the first data model has been trained using one or more shape detection techniques that are driven by a machine learning model;
identifying, by the device, a second group of spatial coordinates for the set of lines within the technical document by processing the data that has been converted using at least one of:
a second data model of the set of data models, or
a set of line detection techniques;
identifying, by the device, a third group of spatial coordinates for the text within the technical document by processing the data that has been converted using a third data model of the set of data models,
wherein the third data model has been trained using one or more text detection techniques;
generating, by the device, a data structure that associates shape data that identifies the set of shapes, line data that identifies the set of lines, and text data that identifies the text, based on the first group of spatial coordinates, the second group of spatial coordinates, and the third group of spatial coordinates; and
performing, by the device, a first set of one or more actions that cause the shape data, the line data, and the text data, to be used by one or more other devices when performing a second set of actions.

2. The method of claim 1, wherein identifying the second group of spatial coordinates comprises:
identifying clusters of values that represent non-white pixels of particular lines,
wherein the non-white pixels share a particular spatial coordinate,
determining lengths of the clusters of values,
determining whether the lengths of the clusters of values satisfy a threshold length,
filtering one or more of the clusters of values based whether the lengths of the clusters of values satisfy the threshold length,
using the clusters of values that have been filtered to identify an initial group of spatial coordinates for horizontal lines and vertical lines included within the technical document, and
using the initial group of spatial coordinates to identify the second group of spatial coordinates that indicate locations for the set of lines within the technical document.

3. The method of claim 1, wherein identifying the second group of spatial coordinates comprises:
identifying an initial group of spatial coordinates that indicate particular locations for one or more groups of consecutive non-white pixels,
identifying particular spatial coordinates for one or more dotted lines within the technical document, and
filtering the initial group of spatial coordinates that indicate the particular locations for the one or more groups of consecutive non-white pixels to exclude particular spatial coordinates for the one or more dotted lines.

4. The method of claim 1, wherein identifying the second group of spatial coordinates comprises:
identifying a particular group of spatial coordinates for one or more lines, of the set of lines, that have a line thickness of two or more pixels,
updating the particular group of spatial coordinates in a manner that causes the particular group of spatial coordinates to represent a reduced line thickness of one pixel, and
using the particular group of spatial coordinates that has been updated to identify the second group of spatial coordinates that indicate locations for the set of lines within the technical document.

5. The method of claim 1, wherein identifying the second group of spatial coordinates comprises:
identifying an initial group of spatial coordinates for lines that are part of the set of lines included within the technical document,
filtering the initial group of spatial coordinates for the lines to include spatial coordinates for endpoints of the lines and to exclude particular spatial coordinates for intermediary points within the lines, and
using the initial group of spatial coordinates that have been filtered to identify the second group of spatial coordinates that indicate locations for the set of lines within the technical document.

6. The method of claim 1, wherein identifying the second group of spatial coordinates comprises:
identifying an initial group of spatial coordinates for two lines that are included within the technical document,
wherein the two lines share an X-coordinate or a Y-coordinate and are separated by a perpendicular line that is not connected to either of the two lines,
determining, using a first line detection technique of the set of line detection techniques, that the two lines are part of a single line,
selecting a first set of endpoint coordinates for a point on a first line, of the two lines, that is furthest from the perpendicular line,
selecting a second set of endpoint coordinates for a point on a second line, of the two lines, that is furthest from the perpendicular line, and
using the first set of endpoint coordinates and the second set of endpoint coordinates, as the initial group of spatial coordinates for the two lines, when using one or more other line detection techniques, of the set of line detection techniques, to identify the second group of spatial coordinates.

7. The method of claim 1, wherein identifying the second group of spatial coordinates comprises:
identifying spatial coordinates for a portion of the technical document that includes background information, and
excluding the spatial coordinates for the portion of the technical document that includes the background information from the second group of spatial coordinates that indicate locations for the set of lines within the technical document.

8. The method of claim 1, wherein identifying the second group of spatial coordinates comprises:
identifying, as part of the second group of spatial coordinates, spatial coordinates for a set of connected lines,
wherein the set of connected lines include at least one horizontal line and at least one vertical line.

9. A device, comprising:
one or more memories; and
one or more processors, operatively coupled to the one or more memories, to:
  receive a technical document that includes content comprising:
    a set of shapes that depict assets,
    a set of lines that connect to the set of shapes and that depict connections to the assets, and
    text describing at least one of:
      one or more of the assets, or
      one or more of the connections;
  perform a set of pre-processing operations to convert data that describes the content to a format that is processed by techniques that detect particular shapes, particular lines, and particular text;
  generate a first array of values that represent a first group of spatial coordinates for the set of shapes within the technical document,
    wherein the first array of values is generated by processing the data that has been converted using one or more shape detection techniques that are driven by a machine learning model;
  generate a second array of values that represent a second group of spatial coordinates for the set of lines within the technical document,
    wherein the second array of values is generated by processing the data that has been converted using a set of line detection techniques;
  generate a third array of values that represent a third group of spatial coordinates for the text within the technical document,
    wherein the third array of values is generated by processing the data that has been converted using one or more text detection techniques that are driven by the machine learning model;
  generate a data structure that associates shape data that identifies the set of shapes, line data that identifies the set of lines, and text data that identifies the text, based on the first array of values, the second array of values, and the third array of values; and
  provide the shape data, the line data, and the text data, for display via an interface that is accessible to one or more other devices to permit the one or more other devices to validate contents of the data structure.

10. The device of claim 9, wherein the one or more processors are further to:
  receive, before receiving the data that describes the contents of the technical document, shapes training data;
  receive a set of files that include data that identifies sets of spatial coordinates for one or more templated sizes of technical documents;
  generate a set of binary masks for shapes within a set of technical documents; and
  train a neural network to identify the shapes within the set of technical documents by using one or more machine learning techniques and the set of binary masks to analyze the shapes training data.

11. The device of claim 9, wherein the one or more processors, when identifying the second group of spatial coordinates, are to:
  identify an initial group of spatial coordinates for an initial set of lines that are included within the received technical document,
  identify two or more lines, of the initial set of lines, that are separated by one or more spaces and that collectively represent a single line,
  determine that the single line connects to at least one of:
    one or more horizontal lines included within the technical document, or
    one or more vertical lines included within the technical document, and
  identify a group of spatial coordinates for the single line and at least one of the one or more horizontal lines or the one or more vertical lines,
    wherein the group of spatial coordinates are part of the second group of spatial coordinates.

12. The device of claim 9, wherein the one or more processors, when identifying the third group of spatial coordinates, are to:
  identify, as part of the third group of spatial coordinates, a first subgroup of spatial coordinates for a first set of characters of the text that is located within a threshold distance of one or more shapes, of the set of shapes within the technical document, and that is not located inside of the one or more shapes,
  identify, as part of the third group of spatial coordinates, a second subgroup of spatial coordinates for a second set of characters of text that is located inside one or more other shapes, of the set of shapes within the technical document, and
  identify, as part of the third group of spatial coordinates, a third subgroup of spatial coordinates for a third set of characters of text that is located within a threshold distance of one or more of the set of lines within the technical document.

13. The device of claim 9, wherein the one or more processors, when identifying the third group of spatial coordinates, are to:
  determine whether particular text is to be placed inside of a shape of the set of shapes within the technical document, and
  analyze an area inside of the shape or on one or more areas outside of the shape based on whether the text is to be placed inside of the shape,
    wherein a particular text detection module is to identify spatial coordinates for the particular text, and
    wherein the spatial coordinates are part of the third group of spatial coordinates.

14. The device of claim 9, wherein the one or more processors, when identifying the third group of spatial coordinates, are to:
scale an area of the technical document that includes particular text,
generate an array of values that represent a binarized version of the area that has been scaled,
filter the array of values to exclude a first set of values that represent particular lines located near sides of the area that has been scaled,
filter the array of values to exclude a second set of values that represent foreground pixels, and
analyze the array of values that has been filtered to identify spatial coordinates for the particular text,
wherein the spatial coordinates are part of the third group of spatial coordinates.

15. The device of claim 9, wherein the one or more processors, when identifying the third group of spatial coordinates, are to:
perform a particular line detection technique, of the set of line detection techniques, on one or more areas around a line, of the set of lines, to identify spatial coordinates for the particular text, and
filter the particular text by referencing one or more configured rules that indicate types of texts or properties of texts that are commonly used around the line,
wherein the spatial coordinates are part of the third group of spatial coordinates and indicate a location for the particular text that has been filtered.

16. A non-transitory computer-readable medium storing instructions, the instructions comprising:
one or more instructions that, when executed by one or more processors of a device, cause the one or more processors to:
receive a data model that has been trained to identify shapes, lines, and text, within technical documents;
receive a technical document that includes content comprising:
a set of shapes that depict assets,
a set of lines that connect to the set of shapes and that depict connections to the assets, and
text describing at least one of:
one or more of the assets, or
one or more of the connections;
perform a set of pre-processing operations to convert data that describes the content to a format that is processed by the data model;
identify a first group of spatial coordinates for the set of shapes within the received technical document by processing the data that has been converted using a first module of the data model,
wherein the first module of the data model has been trained using one or more shape detection techniques that are driven by a machine learning model;
identify a second group of spatial coordinates for the set of lines by processing the data that has been converted using a second module of the data model;
update the second group of spatial coordinates for the set of lines within the received technical document using a set of line detection techniques;
identify a third group of spatial coordinates for the text within the received technical document by processing the data that has been converted using a third module of the data model,
wherein the third module of the data model has been trained using one or more text detection techniques;
generate one or more data structures that associate shape data that identifies the set of shapes, line data that identifies the set of lines, and text data that identifies the text, based on the first group of spatial coordinates, the second group of spatial coordinates, and the third group of spatial coordinates; and
perform a first set of one or more actions that cause the shape data, the line data, and the text data, to be used by one or more other devices when performing a second set of actions.

17. The non-transitory computer-readable medium of claim 16, wherein the one or more instructions, that cause the one or more processors to identify the first group of spatial coordinates, cause the one or more processors to:
generate a set of image crops for sets of pixels of regions within the received technical document,
generate, by using the first module of the data model to analyze the set of image crops, a set of values that indicate likelihoods of the sets of pixels being part of specific shapes,
determine that one or more subsets of values, of the set of values, satisfy a threshold confidence value, and
identify, as the first group of spatial coordinates, particular spatial coordinates that are associated with the one or more subsets of values that satisfy the threshold confidence value.

18. The non-transitory computer-readable medium of claim 16, wherein the one or more instructions, that cause the one or more processors to generate the one or more data structures, cause the one or more processors to:
generate a set of nodes and a set of edges for a data structure, of the one or more data structures, by analyzing the first group of spatial coordinates, the second group of spatial coordinates, and the third group of spatial coordinates,
wherein the set of nodes represent the set of shapes,
wherein node metadata for the set of nodes includes the first group of spatial coordinates and a first subset of the third group of spatial coordinates for particular text associated with the set of shapes,
wherein the set of edges represent the set of lines, and
where edge metadata for the set of edges include the second group of spatial coordinates and a second subset of the third group of spatial coordinates for particular text associated with the set of lines.

19. The non-transitory computer-readable medium of claim 16, wherein the one or more instructions, when executed by the one or more processors, further cause the one or more processors to:
generate, after generating the one or more data structures, a report that indicates an amount of content included within the received technical document that was able to be mapped to contents of the one or more data structures;
provide the report to another device to cause the another device to provide feedback information to the device; and
update the contents of one or more data structures based on the feedback information.

20. The non-transitory computer-readable medium of claim 16, wherein the first set of one or more actions include at least one of:
- a first action to provide contents of the data structure or a report for display via an interface to cause the contents to be accessible to one or more other devices,
- a second action to identify an error within the received technical document,
- a third action to automatically correct the error within the received technical document, or
- a fourth action to provide, for display via the interface, a recommendation to standardize an aspect of the received technical document.

* * * * *